US010747520B2

(12) United States Patent
Shepard et al.

(10) Patent No.: US 10,747,520 B2
(45) Date of Patent: Aug. 18, 2020

(54) RESOURCE DEPLOYMENT USING DEVICE ANALYTICS

(71) Applicant: Microsoft Technology Licensing, LLC, Redmond, WA (US)

(72) Inventors: Marc Shepard, Bellevue, WA (US); Marc-Andrea Klimaschewski, Kirkland, WA (US); Chen Liang, Redmond, WA (US); Ramasubramanian Shastri, Redmond, WA (US); Hung Minh Dang, Seattle, WA (US); Bryston Mitsuo Nitta, Redmond, WA (US); Oana Silvia Nica, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 206 days.

(21) Appl. No.: 15/915,539

(22) Filed: Mar. 8, 2018

(65) Prior Publication Data

US 2018/0300180 A1    Oct. 18, 2018

Related U.S. Application Data

(60) Provisional application No. 62/485,754, filed on Apr. 14, 2017.

(51) Int. Cl.
*G06F 8/60* (2018.01)
*G06F 8/65* (2018.01)
(Continued)

(52) U.S. Cl.
CPC .................. *G06F 8/60* (2013.01); *G06F 8/65* (2013.01); *G06F 11/07* (2013.01);
(Continued)

(58) Field of Classification Search
None
See application file for complete search history.

(56) References Cited

U.S. PATENT DOCUMENTS 7,080,141 B1    7/2006   Baekelmans et al.
7,293,201 B2   11/2007   Ansari
(Continued)

FOREIGN PATENT DOCUMENTS

EP    2189900 A1    5/2010

OTHER PUBLICATIONS

"Non-Final Office Action Issued in U.S. Appl. No. 15/915,556", dated Oct. 16, 2019, 16 Pages.
(Continued)

*Primary Examiner* — Qing Yuan Wu
(74) *Attorney, Agent, or Firm* — Arent Fox LLP

(57) ABSTRACT

Examples described herein generally relate to device analytics. Specifically, the present disclosure provides resource deployment at an organization including one or more devices. The present disclosure provides for receiving telemetry data from the one or more devices associated with the organization. The present disclosure further provides for generating a set of deployment rings for the deployment of the software resource at the one or more devices of the organization. Additionally, the present disclosure provides for deploying the software resource within the organization based on the set of deployment rings.

20 Claims, 17 Drawing Sheets

(51) Int. Cl.
  *G06F 11/34* (2006.01)
  *G06F 11/07* (2006.01)
  *H04L 12/24* (2006.01)
  *H04L 12/26* (2006.01)
  *G06F 119/02* (2020.01)

(52) U.S. Cl.
  CPC ...... *G06F 11/0709* (2013.01); *G06F 11/0793* (2013.01); *G06F 11/34* (2013.01); *G06F 11/3409* (2013.01); *H04L 41/082* (2013.01); *H04L 41/0866* (2013.01); *H04L 41/0893* (2013.01); *H04L 43/065* (2013.01); *G06F 2119/02* (2020.01); *G06F 2212/1032* (2013.01)

(56) References Cited

U.S. PATENT DOCUMENTS

| | | | |
|---|---|---|---|
| 7,562,358 | B2 | 7/2009 | Bennett et al. |
| 7,624,423 | B1 | 11/2009 | Eatough |
| 7,627,543 | B2 | 12/2009 | Lock et al. |
| 7,739,661 | B2 | 6/2010 | Garzia et al. |
| 7,865,889 | B1 | 1/2011 | Bird et al. |
| 7,996,814 | B1 | 8/2011 | Qureshi et al. |
| 8,135,775 | B1 | 3/2012 | Anderson et al. |
| 8,255,902 | B1 | 8/2012 | Satish |
| 8,671,099 | B2 | 3/2014 | Kapoor et al. |
| 8,694,983 | B1 | 4/2014 | Sobel et al. |
| 8,838,755 | B2 | 9/2014 | Sanghvi et al. |
| 8,949,674 | B2 | 2/2015 | Mancoridis et al. |
| 9,166,993 | B1 | 10/2015 | Liu |
| 9,262,366 | B2 | 2/2016 | Lenzmeier et al. |
| 9,274,874 | B1 | 3/2016 | Chamness et al. |
| 9,438,648 | B2 | 9/2016 | Asenjo et al. |
| 9,547,564 | B1 | 1/2017 | Troutman et al. |
| 9,626,277 | B2 | 4/2017 | Thangamani et al. |
| 2004/0123188 | A1 | 6/2004 | Srinivasan et al. |
| 2007/0055914 | A1 | 3/2007 | Chandwani et al. |
| 2010/0014432 | A1 | 1/2010 | Durfee et al. |
| 2013/0159326 | A1 | 6/2013 | Kyomasu et al. |
| 2014/0310222 | A1 | 10/2014 | Davlos et al. |
| 2015/0133076 | A1 | 5/2015 | Brough |
| 2015/0163121 | A1 | 6/2015 | Mahaffey et al. |
| 2015/0242262 | A1* | 8/2015 | Ranganathan ........ G06F 11/079 714/37 |
| 2015/0302303 | A1 | 10/2015 | Hakim |
| 2015/0309826 | A1 | 10/2015 | Kirubanandam et al. |
| 2015/0341240 | A1 | 11/2015 | Iyoob et al. |
| 2016/0292065 | A1 | 10/2016 | Thangamani et al. |
| 2016/0350098 | A1 | 12/2016 | Kuchibhotla et al. |
| 2016/0352768 | A1 | 12/2016 | Lefebvre et al. |
| 2016/0371163 | A1 | 12/2016 | Swierk et al. |
| 2016/0371170 | A1 | 12/2016 | Salunke et al. |
| 2018/0129492 | A1 | 5/2018 | Singh et al. |
| 2018/0302303 | A1 | 10/2018 | Skovron et al. |
| 2019/0018729 | A1 | 1/2019 | Shepard et al. |

OTHER PUBLICATIONS

"Non-Final Office Action Issued in U.S. Appl. No. 15/941,714", dated Oct. 4, 2019, 16 Pages.
"Insights in Windows Upgrade Analytics accelerate Windows 10 upgrades", Retrieved from: https://www.microsoft.com/itshowcase/Article/Content/962/Insights-in-Upgrade-Readiness-accelerate-Windows-10-upgrades, Dec. 20, 2016, 10 Pages.
"Manage Engine Mobile Device Manager Plus—Zoho MDM", Retrieved From: https://web.archive.org/web/20160609150600/https:/www.zoho.com/mdm-cloud.html, Jun. 9, 2016, 6 Pages.
"Mobile Device Management Software—ManageEngine Mobile Device Manager Plus", Retrieved From: https://www.manageengine.com/mobile-device-management/, Retreived on: Jan. 30, 2018, 11 Pages.
"Overview of Office Telemetry", Retrieved From: https://technet.microsoft.com/en-in/library/jj863580.aspx, Dec. 16, 2016, 12 Pages.
Briggs, et al., "Integrate Upgrade Readiness with System Center Configuration Manager", Retrieved From: https://docs.microsoft.com/en-us/sccm/core/clients/manage/upgrade/upgrade-analytics, Jul. 31, 2017, 6 Pages.
Brower, et al., "Get started with Upgrade Readiness", Retrieved From: https://docs.microsoft.com/en-us/windows/deployment/upgrade/upgrade-readiness-get-started, Sep. 20, 2017, 10 Pages.
Brower, et al., "Monitor the health of devices with Device Health", Retrieved From: https://docs.microsoft.com/en-us/windows/deployment/update/device-health-monitor, Nov. 14, 2017, 5 Pages.
Brower, et al., "Use Upgrade Readiness to manage Windows upgrades", Retrieved From: https://docs.microsoft.com/en-us/windows/deployment/upgrade/use-upgrade-readiness-to-manage-windows-upgrades, Aug. 30, 2017, 5 Pages.
Brower, et al., "Using Device Health", Retrieved From: https://docs.microsoft.com/en-us/windows/deployment/update/device-health-using, Oct. 10, 2017, 15 Pages.
Brown, et al., "Use the Readiness Toolkit to assess application compatibility for Office 365 ProPlus", Retrieved From: https://docs.microsoft.com/en-us/deployoffice/use-the-readiness-toolkit-to-assess-application-compatibility-for-office-365-pro, Jan. 2, 2018, 26 Pages.
Paneerselvam, Muthurani Lavanya., "How to determine UC Hardware readiness for upgrade?", Retrieved From: https://supportforums.cisco.com/t5/collaboration-voice-and-video/how-to-determine-uc-hardware-readiness-for-upgrade/ta-p/3150432, Oct. 22, 2013, 17 Pages.
"International Search Report and Written Opinion Issued in PCT Application No. PCT/US2018/027459", dated Oct. 4, 2018, 14 Pages.
"Health and Performance Monitoring", Retrieved From <<http://www.cisco.com/c/en/us/td/docs/security/security_management/cisco_security_manager/security_manager/4-4/user/guide/CSMUserGuide_wrapper/HPMchap.pdf>>, Retreived on: May 15, 2017, 40 Pages.
"Working with Deployment Groups in AWS CodeDeploy", Retrieved From <<http://docs.aws.amazon.com/codedeploy/latest/userguide/deployment-groups.html>>, Retreived on: May 15, 2017, 1 Page.
Halfin, et al., "Build deployment rings for Windows 10 updates", Retrieved From <<https://docs.microsoft.com/en-us/windows/deployment/update/waas-deployment-rings-windows-10-updates>>, Apr. 24, 2017, 3 Pages.
Hangal, et al., "Tracking Down Software Bugs Using Automatic Anomaly Detection", In Proceedings of the 24th International Conference on Software Engineering, May 19, 2002, pp. 291-301.
Jalote, et al., "Measuring Reliability of Software Products", In TechReport of MSR-TR-2004-145, Nov. 1, 2004., pp. 1-8.
"Final Office Action Issued in U.S. Appl. No. 15/915,556", dated Feb. 10, 2020, 17 Pages.
"Non-Final Office Action Issued in U.S. Appl. No. 15/915,556", dated Jun. 10, 2020, 17 Pages.

* cited by examiner

*Figure 9B*

RESOURCE DEPLOYMENT USING DEVICE ANALYTICS

RELATED APPLICATION(S)

The present Application for Patent claims priority to U.S. Provisional Application No. 62/485,754 entitled "DEVICE ANALYTICS" filed Apr. 14, 2017, which is assigned to the assignee hereof and hereby expressly incorporated by reference herein.

BACKGROUND

The present disclosure relates to a device analytics, and more particularly, to providing telemetry-based analytics to identify and remediate top end-user impacting issues on computing devices of users in an information technology network.

Devices that run software may usually require updates over time. The need for software updates may be driven by many factors, such as addressing bugs, adding new functionality, improving performance, maintaining compatibility with other software, and so forth. While many techniques have been used for updating software, an update typically involves changing the source code of a program, compiling the program, and distributing the program to devices where the updated program will be executed.

The increasing network connectivity of devices has led to higher rates of updating by software developers and more frequent reporting of performance-related data (telemetry) by devices. In a short time period, a device may receive many software updates and may transmit many telemetry reports to a variety of telemetry collectors. A software distribution system may rapidly issue many different software updates to many different devices. As devices provide feedback telemetry about performance, crashes, stack dumps, execution traces, etc., around the same time, many software components on the devices might be changing. Therefore, it can be difficult for an information technology administrator and/or software developer to use the telemetry feedback to decide whether a particular software update created or fixed any problems. If an anomaly is occurring on some devices, it can be difficult to determine whether any particular software update is implicated, any conditions under which an update might be linked to an anomaly, or what particular code-level changes in a software update are implicated. In short, high rates of software updating and telemetry reporting, perhaps by devices with varying architectures and operating systems, has made it difficult to find correlations between software updates (or source code changes) and error events and anomalies manifested in telemetry feedback.

Thus, there is a need in the art for improvements in locating error events and/or anomalies in telemetry data and finding correlations between the error events and/or anomalies and software updates on computer devices.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

The present disclosure provides a method, an apparatus, and a computer-readable medium for correlating devices between organizations. The described implementations include determining, at a server, at least a first class of devices using a set of devices associated with at least one organization based on one or more clustering techniques, the first class of devices having one or more attributes similar to the set of devices. Further, the described implementations include determining, at the server, at least one metric set for each device from the set of devices, the metric set including a device-specific metric representing a measurable characteristic of each device and a comparable metric representing an average metric value across the first class of devices. Moreover, the described implementations include providing the at least one metric set to a computing device remote from the server.

The present disclosure provides a further method, apparatus, and computer-readable medium for anomaly remediation of a computing device associated with an organization. The described implementations include detecting an anomaly associated with an application program at the computing device based on a detection parameter. The described implementations further include identifying, automatically at the server, at least one remediation action associated with the detected anomaly, the at least one remediation action configured to adjust one or more operating characteristics of the computing device to address the anomaly. Moreover, the described implementations include determining, at the server, whether application of the at least one remediation action to the detected anomaly satisfies a remediation threshold. Additionally, the described implementations include, in accordance with a determination that the application of the at least one remediation action to the detected anomaly does not satisfy the remediation threshold, forgoing transmission of the at least one remediation action to the computing device. The described implementations include, in accordance with a determination that the application of the at least one remediation action to the detected anomaly satisfies the remediation threshold, transmitting the at least one remediation action to the computing device.

The present disclosure provides an additional method, apparatus, and computer-readable medium for resource deployment at an organization including one or more devices. The described implementations include receiving telemetry data from the one or more devices associated with the organization. The described implementations further include determining device strata including a first stratum device set and a second stratum device set based on the telemetry data, each device stratum set defining one or more device groups within the organization. The described implementations further include mapping each of the first stratum device set and the second stratum device set to one or more external stratum sets from external strata associated with additional telemetry data external to the organization. The described implementations further include identifying the one or more external stratum device sets from the external strata that have deployed a software resource, the deployment of the software resource is associated with promotion criteria. The described implementations further include determining a priority level for each of the one or more external stratum device sets based at least on a set of deployment result metrics. The described implementations further include generating a set of deployment rings for the deployment of the software resource at the one or more devices of the organization based on the priority level for each of the external stratum device sets. The described implementations further include deploying the software resource within the organization based on the set of deployment rings.

The present disclosure provides another method, apparatus, and computer-readable medium for automatic anomaly detection for device population subsets. The described implementations include determining a device population subset from a device population set based on one or more device census fields. The described implementations further include determining one or more anomalies within the device population subset based on performing at least one anomaly detection procedure using the device population subset. Moreover, the described implementations include providing the one or more anomalies to a computing device.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

The present disclosure will be better understood from the following detailed description read in light of the accompanying drawings, wherein like reference numerals are used to designate like parts in the accompanying description:

FIG. 9B is a chart diagram of population slices and one or more associated attributes in accordance with an implementation of the present disclosure;

DETAILED DESCRIPTION

Figure 1:
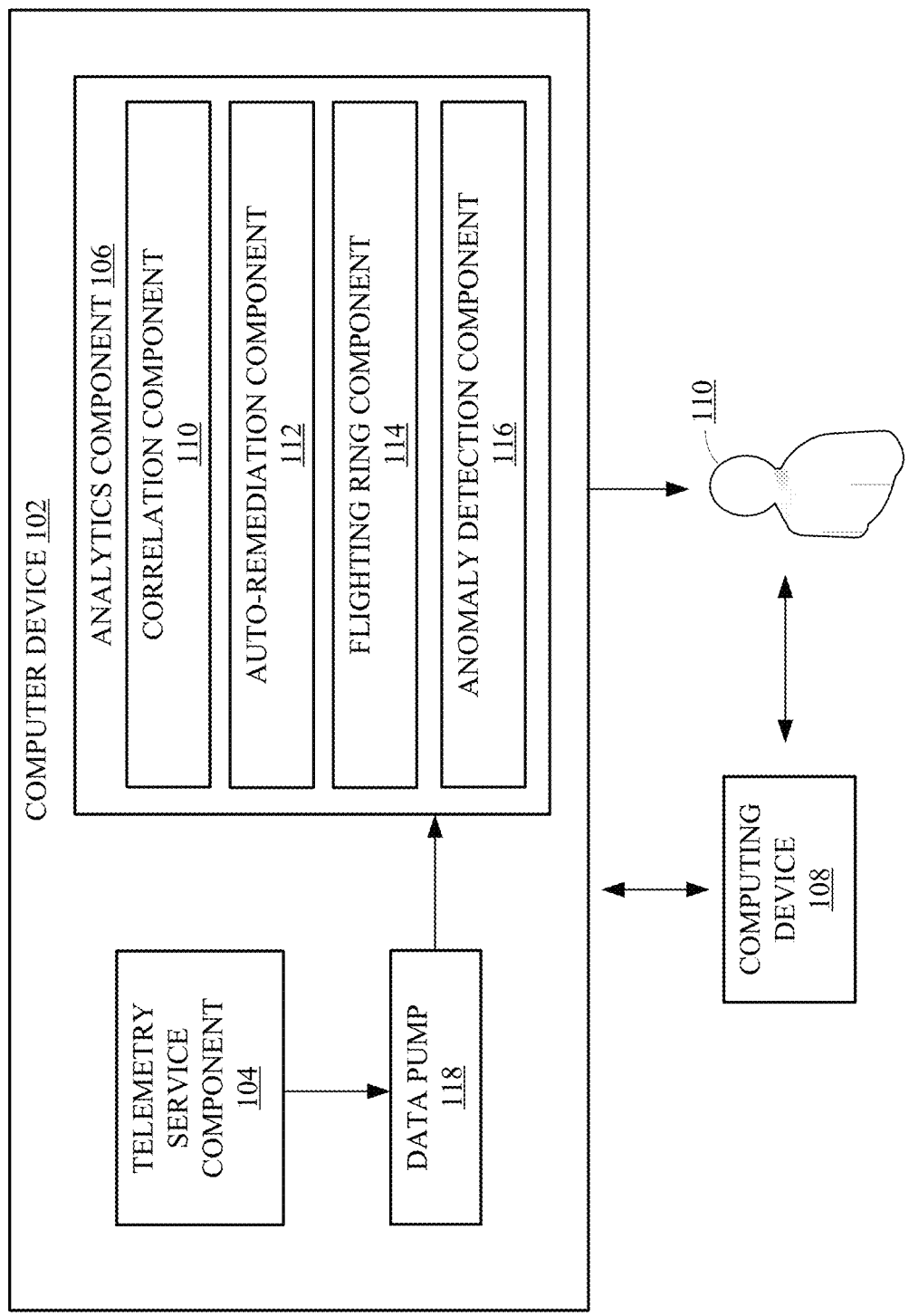
FIG. 1 is a schematic block diagram of an example system for device analytics in accordance with an implementation of the present disclosure.

The present disclosure relates to telemetry-based analytics to identify and remediate top end-user impacting issues. Current information technology (IT) organizations have little visibility into end-users problems (e.g., operating system (OS) crashes, application crashes, network, authorization/login, performance, etc.) aside from direct end-user support calls that may be expensive to service and often happen well after problems occur. These problems are often caused by IT as they roll out configuration changes. For example, in some instances, software deployments or upgrades may be transmitted to or pushed to one or more devices at an organization. However, during software deployments, such devices may face issues or anomalies, some of which may not be detected by an IT administrator and/or the entity providing the software (e.g., software developer) until the user manually reports the anomaly. Further, even if the anomaly is reported to or detected by the IT administrator and/or the entity providing the software, the IT administrator and/or entity may not take immediate action to resolve or remediate the anomaly. As such, there is a need to provide telemetry-based analytics to identify and remediate top end-user impacting issues. Accordingly, telemetry data may be used to automatically determine and deploy remediation options to the affected devices.

For example, in some implementations, organization data of computing devices in an information technology (IT) organization may be compared or correlated to industry/commercial averages, including for similarly configured devices (e.g., devices having similar software and/or hardware characteristics). In some implementations, similarity may represent a level of correlation between one or more hardware and/or software characteristics between devices. Specifically, a company/organization may be targeted to determine a company/organization type (e.g., including industry and size), and then to provide that company/organization with detailed analytics about their devices (e.g., OS crash rates, average deployment times, security posture, etc.), and/or comparisons/correlations relative to commercial devices outside their organization for similar organizations and similar devices. Further, the company/organization may control a desired degree of similarity.

Further, in some implementations, telemetry may be used to automatically drive remediation actions in management tools to address various problems or anomalies uncovered by machine learning procedures that are trained on telemetry data. For example, application compatibility issues may be discovered during or with a new OS deployment. As such, auto-remediation may determine to forgo upgrading the OS on one or more devices and/or update the application before upgrading the OS on such devices. Further, for example, some devices may be determined to crash due to an older driver, missing patch and/or other type of poor configuration. As such, auto-remediation may deploy a newer driver, the missing patch and/or the correct configuration for one or more affected devices.

Additionally, in some implementations, IT organizations may deploy software to a small group of computers (e.g., within an organization), and if no problems arise during the initial deployment, may deploy the software more broadly throughout the organization or elsewhere. For example, a set of deployment rings may be larger for larger organizations. Accordingly, telemetry may be used to automatically create or assist in the creation of deployment rings by determining or locating devices with a target diversity level in different flighting rings. Further, promotion criteria (e.g., quality validation criteria) may be formed by IT to control the flow or deployment of software from one deployment ring to a next deployment ring. For example, the promotion criteria may need to be satisfied before software may be allowed to flow to the next deployment ring.

Moreover, in some implementations, device anomalies may be automatically detected for population slices of device measurements. Specifically, the present implementations may automatically detect anomalies which affect smaller slices of the population. For example, a high level representation of a population of devices may indicate an adequate level or percentage of operation (e.g., percentage of devices reporting/experiencing no anomalies). However, within the population, there may exist a population slice (e.g., a subset of the population) having one or more common attributes or characteristics that exhibit anomalies and fall short of the target level or percentage of normal operation. As such, the automatic anomaly detection may utilize the telemetry data to identify or detect the anomaly based on correlating a metric associated with the population slice to a target metric value. Subsequently, the anomaly may be addressed for the devices within the population slice.

Referring now to FIG. 1, an example device analytics system 100 may include at least one computer device 102 in communication with a computing device 108 of a user 110. Specifically, the computing device 108 may be part of or associated with an organization or company of the user 110. As such, computing device 108 may be part of a larger pool or group of devices of the organization or company. Further, although not illustrated, computer device 102 may communicate with one or more devices including computing device 108.

Computer device 102 may include telemetry service component 104, which may be configured to receive or otherwise acquire telemetry data from one or more devices including computing device 108 across one or more organizations or companies. For example, telemetry data may be system and/or event data that is uploaded by a telemetry component at the computing device 108. In some implementations, telemetry data may include information about the computing device 108 such as configuration information (e.g., including hardware attributes such as CPU, installed memory, and storage), as well as quality-related information such as uptime and sleep details and the number of crashes or hangs. Additional information may include a list of installed apps and drivers. In some implementations, telemetry service component 104 may obtain and store the telemetry information outlined in Table 1 below.

TABLE 1

Example Telemetry Event List

| Provider | Event Name | Purpose |
| --- | --- | --- |
| Census | Census.* (various) | Needed by all device analytics solutions. Basic machine configurations and enterprise commercial id tag |
| Microsoft.Windows.WindowsErrorReporting | Microsoft.Windows.WindowsErrorReporting.WerEvent | Crash data |
| Microsoft.Windows.Inventory.Core | Microsoft.Windows.Inventory.Core.* (various) | Driver and application inventory data to know what drivers and applications are installed on what machines |

Further, computer device 102 may also include data pump 118, which may transfer data from or between the telemetry service component 104 to the analytics component 106 using a data-driven schema. In some implementations, the movement and transformation of telemetry data may be driven by configuration files.

The analytics component 106 may be configured to automatically identify and remediate device issues and/or anomalies in accordance with at least one of the correlation component 110, the auto-remediation component 112, the flighting ring component 114, and/or the anomaly detection component 116.

The correlation component 110 may be configured to correlate organization data (e.g., information technology (IT) organization) with industry/commercial averages, including for similarly configured devices (e.g., devices having similar software and/or hardware characteristics) for indicating potential metric deficiencies. For example, the correlation component 110 may perform one or more clustering procedures over one or more devices including the computing device 108 associated with or part of an organization (e.g., may include devices outside the IT organization) to determine similar devices external to or unassociated with the organization of the one or more devices including the computing device 108.

In some implementations, similar devices may have a defined level of correlation with respect to one or more hardware and/or software characteristics/attributes between the one or more devices including the computing device 108 of the organization. For example, similarity between devices (e.g., first organization device and second organization device) may include device-specific attributes such as, but not limited to, original equipment manufacturer (OEM), model, model variant, type of hardware, the device operating system, stock keeping unit (SKU), edition, version, and/or patch level. Further, for instance, similarity between devices (e.g., first organization device and second organization device) may include a company type at which the device is used or associated with, such as, but not limited to industry segment, customer size, country, as well as device configuration information such as, but not limited to installed apps, installed drivers, policy configuration, and/or user settings.

Further, as part of determining at least one metric (e.g., health, compatibility, reliability, performance, or other such records) for each device including the computing device 108 within an organization or group, the correlation component 110 may be configured to determine a summary of an averages of the metrics for device in the same cluster/group. For example, a record for a device may include an "OSCrashRate" metric along with the corresponding industry average.

As such, by averaging the metric across all devices (or any given subset) within an organization, and in some implementations factoring in normalization data (e.g., device usage time), the correlation component 110 may be configured to determine the average of the metric across the organization's devices. Further, by averaging the "IndustryAverage" metric across all the organization's devices, the correlation component 110 may also determine the average of such metric for industry devices that are similar according to the clustering procedure.

The auto-remediation component 112 may be configured to utilize telemetry to automatically drive remediation actions in management tools to address various problems or anomalies. Specifically, the auto-remediation component 112 may generate one or more rules defining an application of an auto-remediation action based on a detection rule that detects a device anomaly/issue and remediation criteria. For example, the remediation criteria may determine whether application of the remediation action will improve the anomaly/issue.

In some implementations, the detection rules may include data gathered from within the organization/company (e.g., problems/anomalies experienced by the devices within the organization) or from the system's aggregation of external data (e.g., known compatibility, reliability, or performance issues associated with certain configurations). Further, remediation criteria from external data may be added. Similarly, remediation criteria may be received from either company data or from the system's aggregation of external data. In some implementations, findings from a smaller population may be overlaid onto a larger population to perform automatic remediation.

The flighting ring component 114 may be configured to form one or more deployment rings and promotion criteria for software distribution within an organization. Specifically, the flighting ring component 114 may be configured to determine such deployment rings based on a diverse set of devices within the organization. Additionally, using device information such as type of device, device hardware, and device software, the flighting ring component 114 may allocate or place particular devices within an organization into distinct deployment rings (e.g., may also provide a list of devices ideal for flighting). By considering a wide range of devices within an organization (e.g., across various departments and levels), a diverse set of devices may be assigned or allocated to each deployment ring or group.

For example, the flighting ring component 114 may receive a request including information of pilot or flighting size as well as pilot or deployment constraints. For example, the constraints may include restricting selection to a set of devices within a pool of devices, to certain geographic boundaries, and/or to groups of devices or users. The flighting ring component 114 may automatically select a minimum set of devices that may enable evaluation of promotion criteria that permit the deployment of software from one deployment ring to another. As such, in some implementations, the promotion criteria may be a set of metrics (e.g., install success rate, post-install reliability, performance, and/or user sentiment criteria) and/or a set of configurations.

In some implementations, the set of configurations may be across a specific set of diversity filters similar to those included as part of the correlation component (e.g., device model, OS version, apps, drivers, configuration, etc.). As such, the flighting ring component 114 may gain coverage of business critical apps running in various configurations.

In some implementations, the flighting ring component 114 may need a certain number of devices to evaluate the metrics within the subset of devices that are deemed important. Further, the ring population may be automatically formed using enough devices to create statistically significant validation of the promotion criteria. Additionally, the flighting ring component 114 may need an increased level of validation for private or internal application as compared to public applications. Further, the flighting ring component 114 may overlay acquired data from a pilot population to the impact software deployment may have on the other devices, and to take action proactively before promoting, thereby effectively predicting impact on a population of devices.

The anomaly detection component 116 may be configured to detect anomalies that affect a subset of a population set. For example, in some instances, viewing or analyzing a large population set may not indicate any discernable anomalies as a high percentage of devices within the population set are operating normally (e.g., no anomalies detected/reported). However, within the population set, there may exist a subset of devices having common attributes or characteristics (e.g., common geographic region, organization, device type, OS version, etc.) that may be exhibiting higher levels of anomalies compared to the other devices within the population set.

The anomaly detection component 116 may determine the population slice to monitor, automatically detect a regression/anomaly in any given slice, and/or automatically identify common attributes between slices which are exhibiting a regression/anomaly. For example, within a table including various device census fields, a population set may be arranged according to population slices or portions. For example, as shown in FIG. 9B, and further described below, the table 940 may include one or more rows representing population slices and one or more columns representing different attributes. The anomaly detection component 116 may determine, for a given population slice, whether a metric score satisfies a target metric threshold.

Specifically, the anomaly detection component 116 may correlate or compare a current metric value for the given population slice to at least one previous metric value (e.g., compare metric values over time) to determine whether the metric deviates or breaks a trend. Further, the anomaly detection component 116 may also correlate or compare the metric against a whole or entirety of the population set. In some implementations, each metric may be a statistic value produced by a state machine at a certain time based on events. Further, upon detecting an anomaly, the anomaly detection component 116 may search for or identify other sets of devices that may have or exhibit similar anomalies and may analyze the features of those sets of devices to assist with resolving the anomaly.

Computer device 102 may include any mobile or fixed computer device, which may be connectable to a network. Computer device 102 may be, for example, a computer device such as a desktop or laptop or tablet computer, a server, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

Computer device 102 may include a memory and CPU configured to control the operation of computer device 102. Memory may be configured for storing data and/or computer-executable instructions defining and/or associated with an operating system and/or application, and CPU may execute operating system and/or application. An example of memory can include, but is not limited to, a type of memory usable by a computer, such as random access memory (RAM), read only memory (ROM), tapes, magnetic discs, optical discs, volatile memory, non-volatile memory, and any combination thereof. Memory may store local versions of applications being executed by CPU.

The CPU may include one or more processors for executing instructions. An example of CPU can include, but is not limited to, any processor specially programmed as described herein, including a controller, microcontroller, application specific integrated circuit (ASIC), field programmable gate array (FPGA), system on chip (SoC), or other programmable logic or state machine. The CPU 114 may include other processing components such as an arithmetic logic unit (ALU), registers, and a control unit. Further, the operating system may include instructions (such as one or more applications) stored in memory and executed by the CPU. The computer device 102 may also include an application including instructions stored in memory and executed by the CPU. The application, for example, may be a analytics application that provides telemetry-based analytics to identify and remediate top end-user impacting issues.

Figure 2:
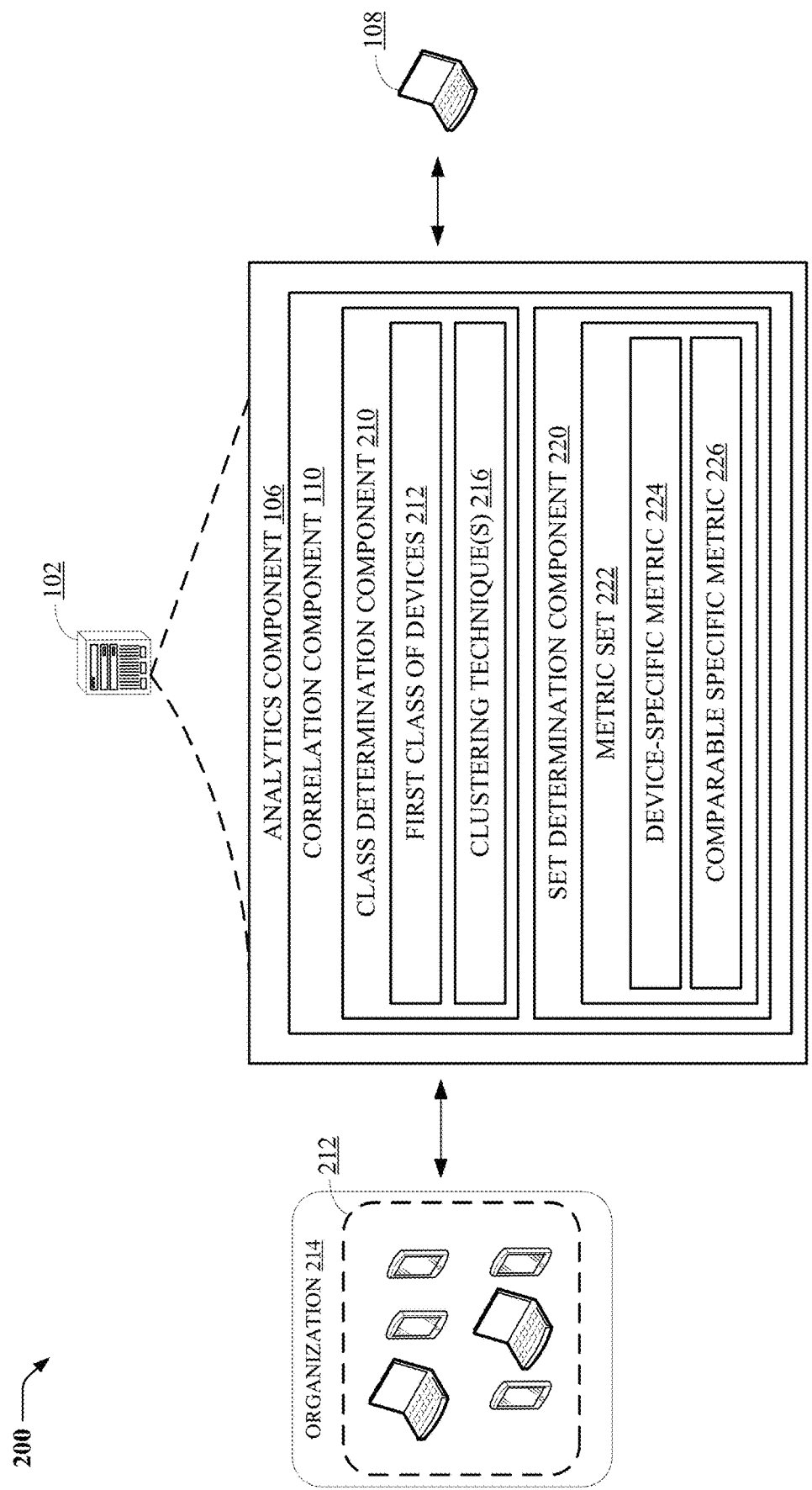
FIG. 2 is a schematic block diagram of correlating devices between organizations by an example correlation component in accordance with an implementation of the present disclosure.

Referring to FIG. 2, an example schematic diagram 200 illustrating an example of correlating devices between organizations by an example correlation component, such as the correlation component 110 of the analytics component 106, in accordance with various implementations of the present disclosure is described. For example, the analytics component 106 and/or correlation component 110 may be included in the computer device 102 (e.g., a server) as described herein. The analytics component 106 may configure the correlation component 110 to correlate devices between organizations. That is, the analytics component 106 and/or correlation component 110 may be configured to examine a company to determine what type of company it is (including the industry and size of the company), and then provide that company with the detailed analytics about computer devices associated with the company (e.g., OS crash rates, average deployment times, security posture, etc.), and provide comparisons to how the computer devices associated with the company are performing relative to commercial devices outside the company (i.e., organization) for similar companies and/or similar computer devices. The analytics component 106 and/or correlation component 110 may control the degree of similarity between organizations. Various metrics may be controlled by providing insights into how the metrics compare to other metrics. The analytics component 106 and/or correlation component 110 may make critical decisions about how to improve this metric by changing some aspect of the computer devices (e.g., OS version or configuration) even the organizations do not have enough computer devices in their organization to draw a statistically significant conclusion from.

In some implementations, the analytics component 106 and/or correlation component 110 may perform one or more clustering algorithms over the computer devices (including computer devices outside the IT organization) to determine similar computer devices. Similarly, the analytics component 106 and/or correlation component 110 may include at least one of the attributes about the computer device itself (e.g., OEM, model, model variant, type of hardware, etc.), the computer device operating system (SKU, edition, version, patch level, etc.), the type of company in which it is used (industry segment, customer size, country, etc.), and computer device configuration (installed apps, installed drivers, policy configuration, user settings, etc.).

In some implementations, the analytics component 106 and/or correlation component 110 may emit a metric for the IT organization for each of their respective computer devices (e.g., health, compatibility, reliability, performance, or other such records), including a summary of the averages of these metrics for the computer devices in the same cluster. For example, a record for a computer device might include an "OSCrashRate" metric along with the corresponding industry average:

Device1 <device properties> <OS properties> <configuration properties>
OSCrashRate IndustryAverageCommercialCrashRate-clusterAlgo1,
IndustryAverageCommercialCrashRate-clusterAlgo2, . . .

By averaging the metric across all of the organization's computer devices (or any given subset of computer devices), and optionally factoring in normalization data (such as computer device usage time), the organization may examine the average of the metric on their computer devices. By averaging the IndustryAverage metric across all of their devices, the organization may identify the average of this metric for industry computer devices that are similar according to the clustering algorithm. In some examples, the analytics component 106 and/or correlation component 110 may support multiple clustering algorithms by emitting separate IndustryAverage metrics for each algorithm. In an implementation, the analytics component 106 and/or correlation component 110 may compare the computer devices of the organization to "typical commercial devices", or "typical devices with the same mix of OEMs and device models", or "typical devices in organizations of my size" or any combination of these that are deemed important. Other metrics such as industry percentiles (e.g., the value of the metric for the Nth percentile of similar computer devices) may also be supplied. The clustering algorithm, processing of industry average, and augmentation of this data for the organization occurs in the system/platform thereby preventing the organization from having access to detailed computer device information about anything other than their computer devices.

In an implementation, the correlation component 110 may include a class determination component 210, which may be configured to determine at least a first class of devices 212 using a set of devices associated with at least one organization 214 based on one or more clustering techniques 216. For example, the first class of devices 212 having one or more attributes similar to the set of computer devices.

In an implementation, the correlation component 110 may include a set determination component 220, which may be configured to determine at least one metric set 222 for each device from the set of devices. For example, the metric set 222 may include a device-specific metric 224 representing a measurable characteristic of each device and a comparable metric 226 representing an average metric value across the first class of devices 212.

In an implementation, the analytics component 106 and/or the correlation component 110 may be configured to provide the at least one metric set 222 to a computing device 108 remote from the server 102.

Figure 3:
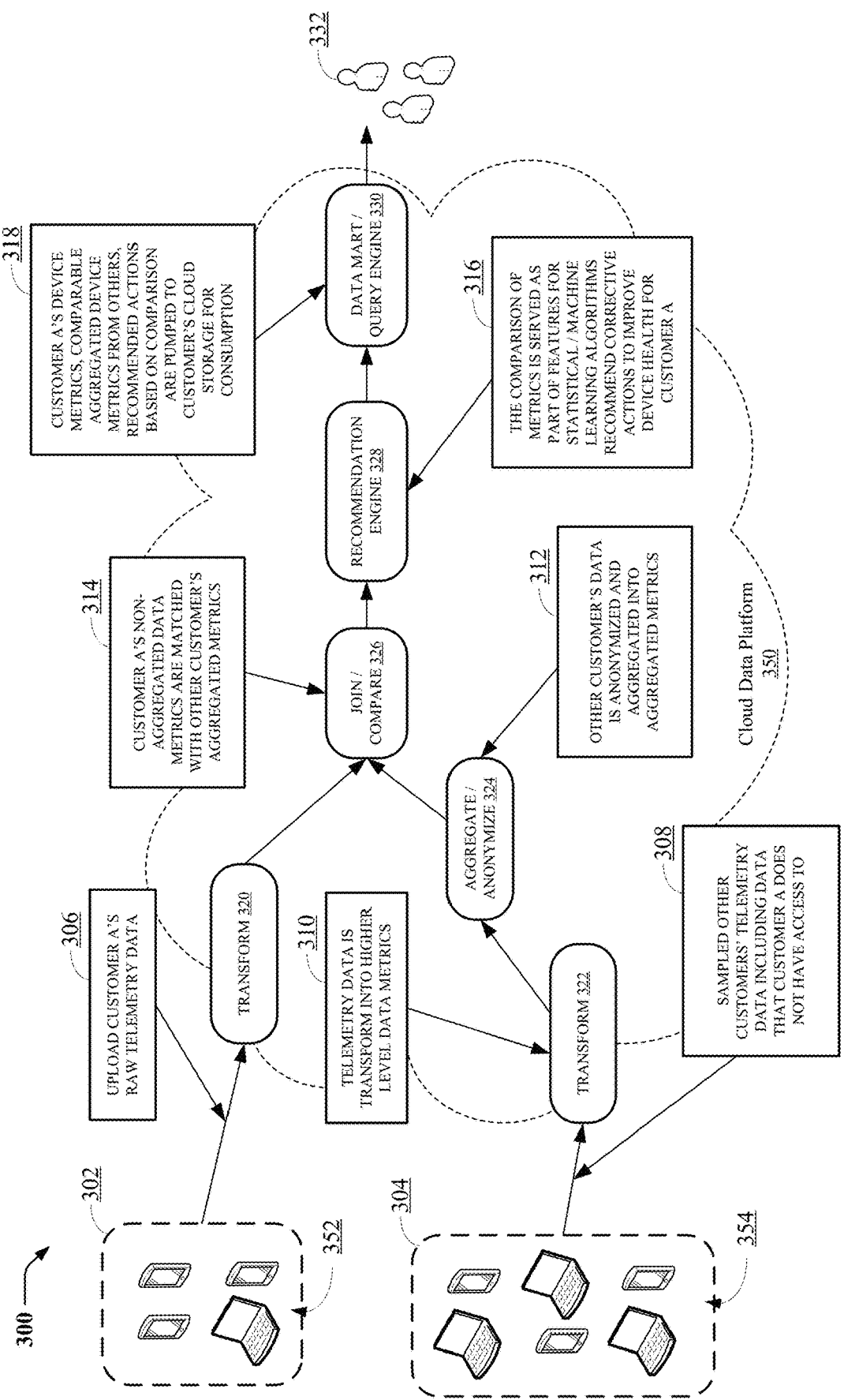
FIG. 3 is a conceptual diagram of correlating devices between organizations in accordance with an implementation of the present disclosure.

Referring to FIG. 3, a conceptual diagram 300 of correlating devices between organizations in accordance with various implementations of the present disclosure is described. For example, a computer device, such as the computer device 102, may execute the analytics component 106 and/or correlation component 110 to correlate computer devices corresponding to a first customer 352 (e.g., Customer A) and/or a second customer 354 (e.g., Other Customers) between organizations. In an example, the computer for both the first customer 352 and other sampled data that the first customer 352 does not have access to. In an implementation, at 312, data metrics generated from one or more computer devices of the first customer 352 are aggregated and anonymized. For example, the data with statistical significance are kept and maintained.

In an implementation, at 314, the aggregated data metrics are matched with the data of the first customer 352 based on a determination that both the aggregated data metrics and the data of the first customer 352 are comparable. For example, the comparability may include a computer crash rate from other computer devices associated with the second customer 354 (e.g., Other Customers) that share similar models to those of the first customer 352. The comparable metrics are used to generate insights and provide recommendations for actions at 316. In some implementations, examples of the customers' data metrics and comparable metrics are outlined in Table 2 below.

TABLE 2

Example Joining of a Customer's Data with Comparable Industry Data

| Device ID | Manuf | Model | Arch | OS Edition | OS Version | OS Build | Crash Count | Crash Free Industry | Reliability Score | Reliability Score Industry |
|---|---|---|---|---|---|---|---|---|---|---|
| dev1 | Man A | Model A | amd64 | Enterprise | 1703 | 15063.483 | 0 | 85% | 100 | 88.21 |
| dev2 | Man B | UNKNOWN | amd64 | Enterprise | 1703 | 15063.483 | 0 | 89% | 100 | 90.72 |
| dev3 | Man C | Model B | amd64 | Enterprise | 1703 | 15063.483 | 0 | 95% | 100 | 96.07 |
| dev4 | Man A | Model A | amd64 | Enterprise | 1703 | 15063.483 | 1 | 85% | 31 | 88.21 |
| dev5 | Man A | Model A | amd64 | Enterprise | 1703 | 15063.483 | 0 | 90% | 100 | 91.83 |
| dev6 | Man D | Model C | amd64 | Enterprise | 1703 | 15063.483 | 0 | 98% | 100 | 98.12 |
| dev7 | Man D | Model C | amd64 | Enterprise | 1703 | 15063.483 | 0 | 99% | 100 | 99.07 | device 102 may correspond to and/or access the cloud data platform 350. As described herein, the analytics component 106 and/or correlation component 110 may create insight based comparable data from external computer devices (e.g., corresponding to the second customer 354) that the first customer 352 (e.g., Customer A) does not have access to.

In an implementation, at 302, telemetry data, may be sent from the computer devices associated with the first customer 352 (e.g., Customer A) to the cloud data platform 350 upon usage of each of the computer devices. Additionally, at 304, the computer devices associated with the second customer 354 (e.g., Other Customers) may send telemetry data to the cloud data platform 350. In an example, the computer devices associated with the second customer 354 are not owned by the first customer 352. In some instances, a portion of the computer devices associated with the second customer 354 may be similar to a portion of the computer devices associated with the first customer 352.

In an implementation, at 306, the telemetry data of the first customer 352 (e.g., Customer A), needed for analysis, are uploaded to the cloud data platform 350. For example, the applications and drivers corresponding to the computer devices of the first customer 352 may have encountered a fault to cause the application or the operating system to crash. Further, at 308, telemetry data corresponding to computer devices associated with the second customer 354 (e.g., Other Customers) are sampled and uploaded to the cloud data platform 350. For example, one or more comparable applications and drivers that the first customer 352 has configured may encounter a fault.

In an implementation, at 310, the cloud data platform 350 may apply data transformation on the raw data to produce data metrics at a computer, application, and/or driver level In an implementation, at 316, cloud data platform 350 uses comparable metrics to provide insights or recommendations. For example, if the crash rate of the first customer 352 on a particular model of the computer device is higher than the industry (e.g., the crash rate of other computer devices associated with the second customer 354) then the first customer 352 is recommended to address the problem causing a higher than average crash rate. In some implementations, the cloud data platform 350 may upgrade defective drivers to lower the crash rate based on crash rate aggregated metrics from the industry.

In an implementation, at 318, cloud data platform 350 may send the metric data of the first customer 352, the comparable aggregated metric data from the industry (e.g., computer devices associated with the second customer 354), and insights and/or recommended actions to a data store of the first customer 352 (e.g., data mart/query engine 330). In some implementations, the cloud data platform 350 may send and/or visualize the data based on a query from the first customer 352 and/or an information technology (IT) person 332.

Figure 4:
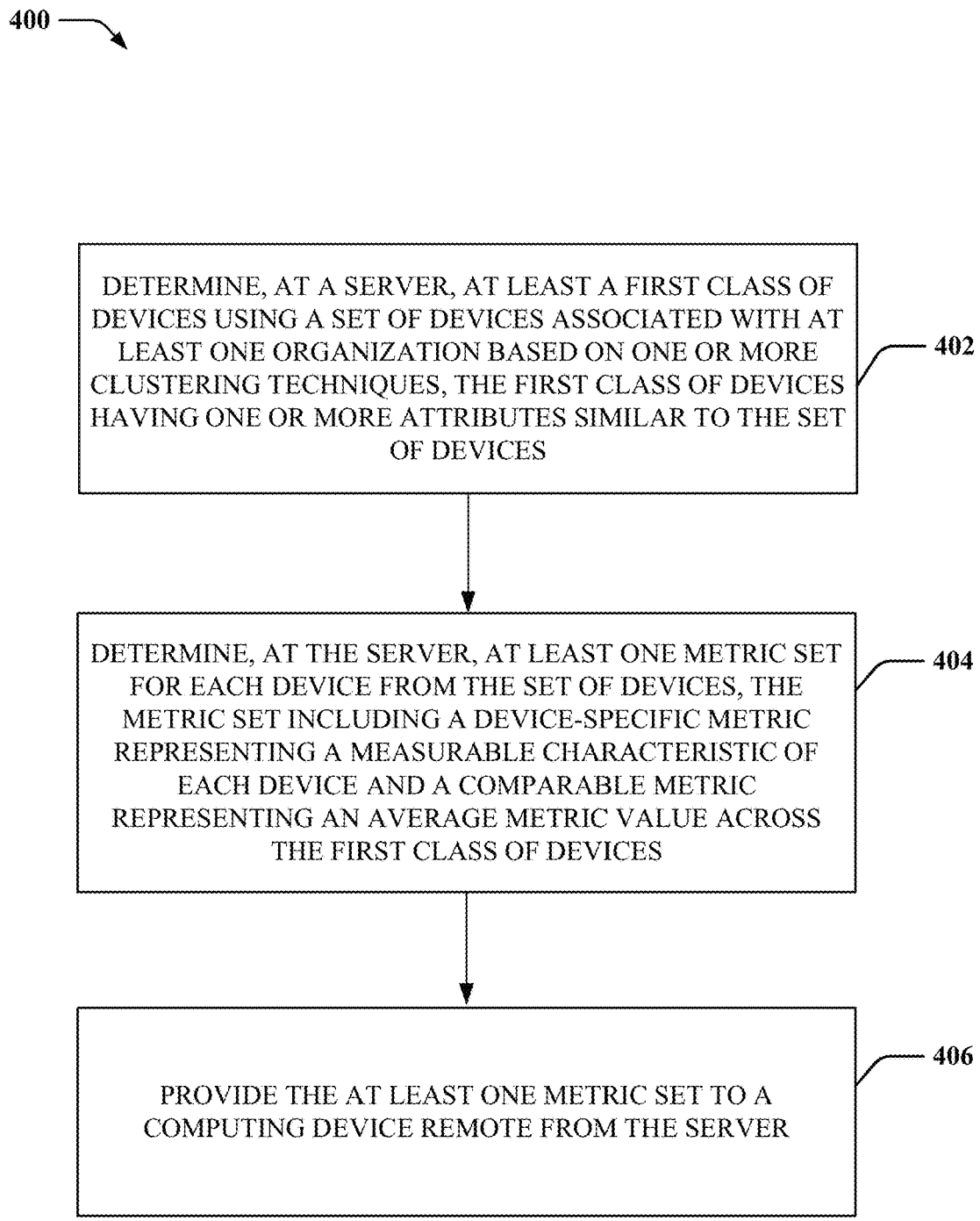
FIG. 4 is a flow chart of a method of correlating devices between organizations in accordance with an implementation of the present disclosure.

Referring now to FIG. 4, an example method 400 provides for the computer device 102 to correlate devices between organizations, such as via operation of correlation component 110. The actions illustrated in method 400 may overlap in time. For example, at an instant in time, two of the actions may be performed by different components. The execution of the actions may also be interleaved on a component. Additionally, the actions illustrated in method 400 may be performed in an order other than illustrated in FIG. 4.

At 402, method 400 may determine, at a server, at least a first class of devices using a set of devices associated with at least one organization based on one or more clustering techniques, the first class of devices having one or more attributes similar to the set of devices. For example, as described herein, the computer device 102 may execute the correlation component 110 to determine at least a first class of devices (e.g., similarly configured device) using a set of devices (e.g., devices at or of an organization) associated with at least one organization based on one or more clustering techniques, the first class of devices having one or more attributes similar to the set of devices.

Further, at 404, method 400 may determine, at the server, at least one metric set for each device from the set of devices, the metric set including a device-specific metric representing a measurable characteristic of each device and a comparable metric representing an average metric value across the first class of devices. For example, as described herein, the computer device 102 may execute the correlation component 110 to determine at least one metric set (e.g., health, compatibility, reliability, and/or performance) for each device from the set of devices, the metric set including a device-specific metric representing a measurable characteristic of each device and a comparable metric representing an average metric value across the first class of devices (e.g., summary of the averages of each metric within the metric set for devices in the same cluster).

At block 406 provide the at least one metric set to a computing device remote from the server. For example, as described herein, the computer device 102 may execute the correlation component 110 to provide the at least one metric set to a computing device 108 remote from the server.

The metric sets of method 400 may be utilized, for example, by auto-remediation component 112 to identify and one or more remediation actions to correct any problems identified by less than desirable performance.

Figure 5:
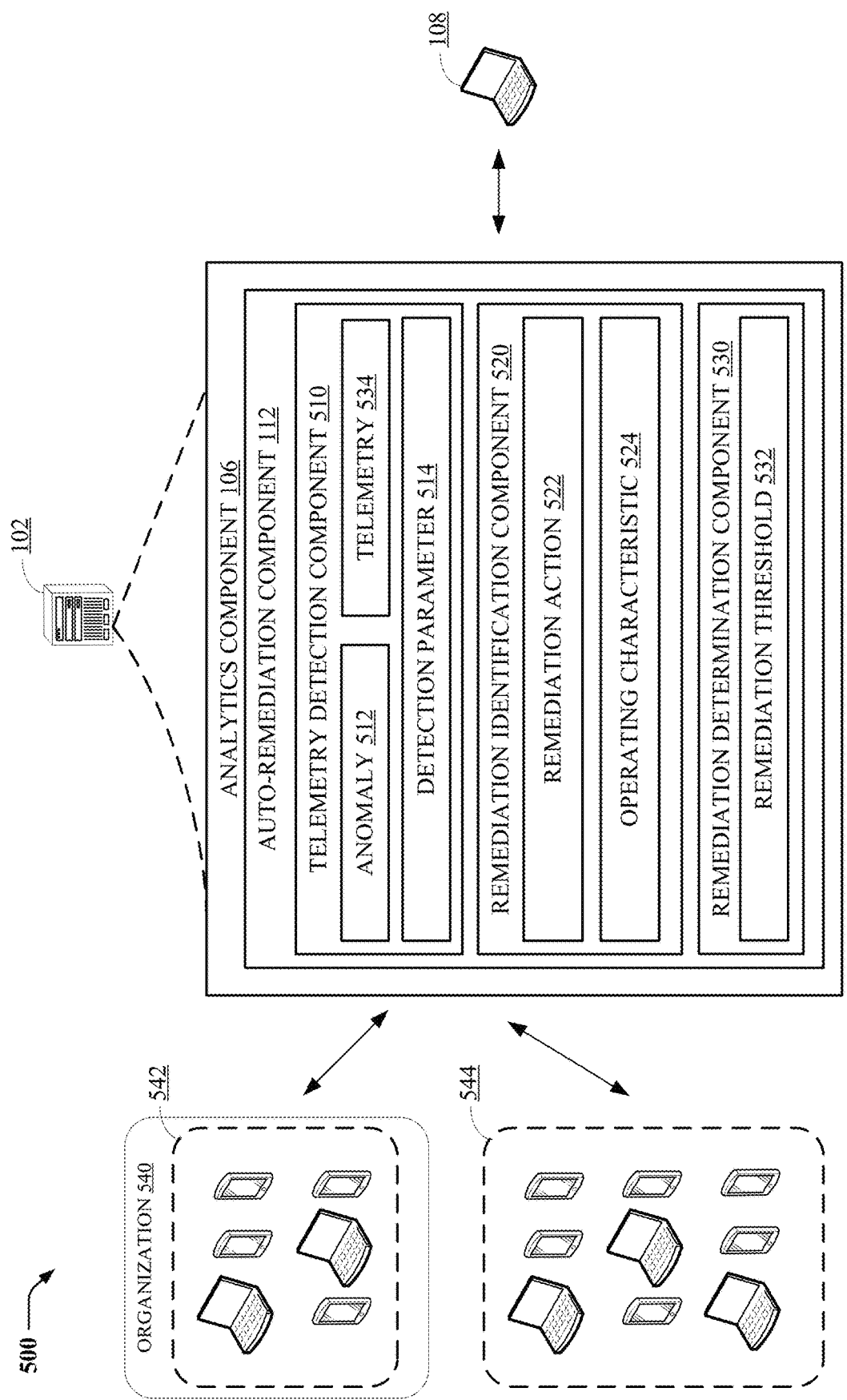
FIG. 5 is a schematic block diagram of anomaly remediation of a computing device by an example auto-remediation component in accordance with an implementation of the present disclosure.

Referring to FIG. 5, an example schematic diagram 500 illustrating an example of anomaly remediation of a computing device by an example auto-remediation component, such as the auto-remediation component 112 of the analytics component 106, in accordance with various implementations of the present disclosure is described. For example, the analytics component 106 and/or auto-remediation component 112 may be included in the computer device 102 (e.g., a server) as described herein. The analytics component 106 may configure the auto-remediation component 112 to remediate anomalies of a computing device.

In some implementations, the analytics component 106 and/or the auto-remediation component 112 use telemetry to automatically drive remediation actions in management tools such as Intune or SCCM to various problems uncovered by machine learning algorithms that are trained on telemetry data. For example, the analytics component 106 and/or the auto-remediation component 112 may discover app-compatibility issues with a new OS deployment and auto-remediate by not upgrading the OS and/or by update the app before upgrading the OS. In a further example, the analytics component 106 and/or the auto-remediation component 112 may discover that some computer devices are crashing due to an older driver, missing patch, or other type of poor configurations, and automatically remediate these issues by deploying a newer driver, the missing patch, or the right configuration.

The analytics component 106 and/or the auto-remediation component 112 may create one or more rules on how to apply an auto-remediate action based on a detection rule (noticing the problem) and remediation criteria (deciding if the remediation action will lead to an improvement or not). The detection rules may include data gathered from within the company (e.g., problems associated with the computer devices) or from the system's aggregation of external data (e.g., known compatibility, reliability, or performance issues associated with certain configurations). In some instances, criteria from external data may also be added. Similarly, remediation criteria may be derived from either company data or from the system's aggregation of external data.

In an example, the analytics component 106 and/or the auto-remediation component 112 detects a high crash rate of an older version of a driver (the detection rule), and remediates it automatically on the affected computer devices by updating to a newer version of the driver (e.g., the right version of the driver was determined by the remediation criteria that the driver crash rate of the replacement driver must be lower—where the crash rate data comes from both organizations' computer devices as well as industry averages). The analytics component 106 and/or the auto-remediation component 112 may be configured to edit or stop this automated rule. In some instances, the "rule" here might be that "if an older driver is crashing at least X % of machines on which it is deployed (and some min number), and if a new version of the driver is available that is predicted (using internal and external data) to reduce the crash rate by Y % then automatically deploy it to the effected devices."

In an example, the analytics component 106 and/or the auto-remediation component 112 detects an application compatibility problem (e.g., the detection rule, which will be driven by a combination of the organization's data as well as external industry data), and the resolution is to auto-upgrade the application (e.g., the remediation rule). The rule here may be that "if a critical application compatibility issue (e.g., where the application no longer works on a newer version of the OS) is detected and a newer version of the application is available which do not have this compatibility issue, for upgrade, the auto-upgrade it."

In an example, the auto-remediation action may include asking the organization to resolve ambiguity and make a decision. This decision may also be informed by other organization data as well as industry data. In some instances, the organization informs the system not to auto-update a critical business application, but the system has detected an application compatibility issue of that application with the OS that is about to roll out. In this instance, the organization upgrades the application (e.g., if the organization eventually promotes the OS version for roll-out), and to what version of the application (where recommended application versions may come to them from various external sources).

In an implementation, the auto-remediation component 112 may include a telemetry detection component 510, which may be configured to detect, at a server 102, an anomaly 512 associated with an application program at a computing device based on a parameter 514.

In an implementation, the auto-remediation component 112 may include a set remediation identification component 520, which may be configured to identify, automatically at the server 102, at least one remediation action 522 associated with the detected anomaly 512. For example, the at least one remediation action 522 configured to adjust one or more operating characteristics 524 of the computing device to address the anomaly 512.

In an implementation, the auto-remediation component 112 may include a set remediation determination component 530, which may be configured to determine, at the server 102, whether application of the at least one remediation action 522 to the detected anomaly 512 satisfies a remediation threshold 532. For example, the server 102 and/or the analytics component 106 may be configured to forgo transmission of the at least one remediation action 522 to the computing device 108 based on a determination that the application of the at least one remediation action 522 to the detected anomaly 512 does not satisfy a remediation threshold 532. In a further example, the server 102 and/or the analytics component 106 may be configured to transmit the at least one remediation action 522 to the computing device 108 based on a determination that the application of the at least one remediation action 522 to the detected anomaly 512 satisfies a remediation threshold 532.

Figure 6A:
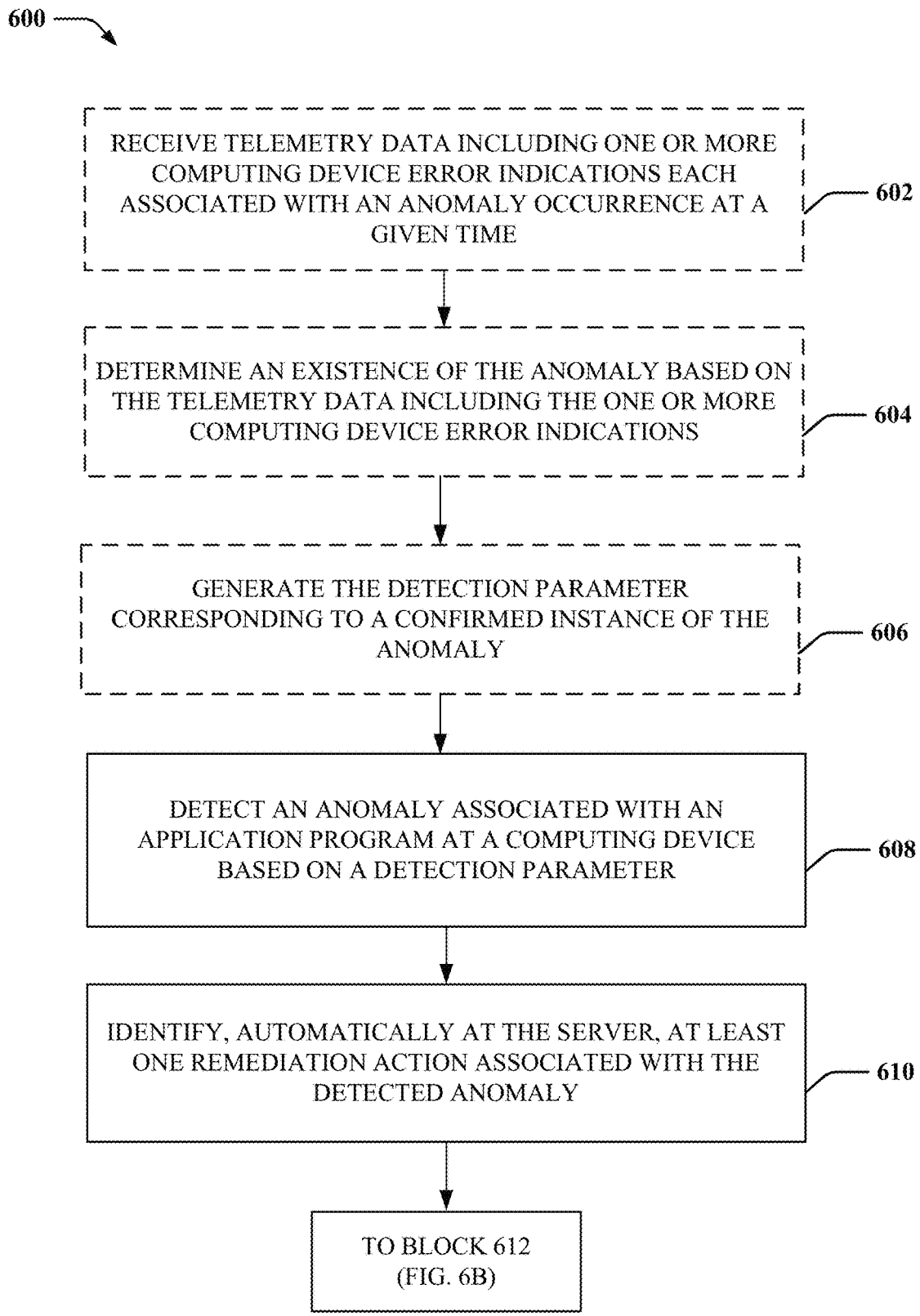
FIGS. 6A and 6B are flow charts of a method of anomaly remediation of a computing device in accordance with an implementation of the present disclosure.
Figure 6B:
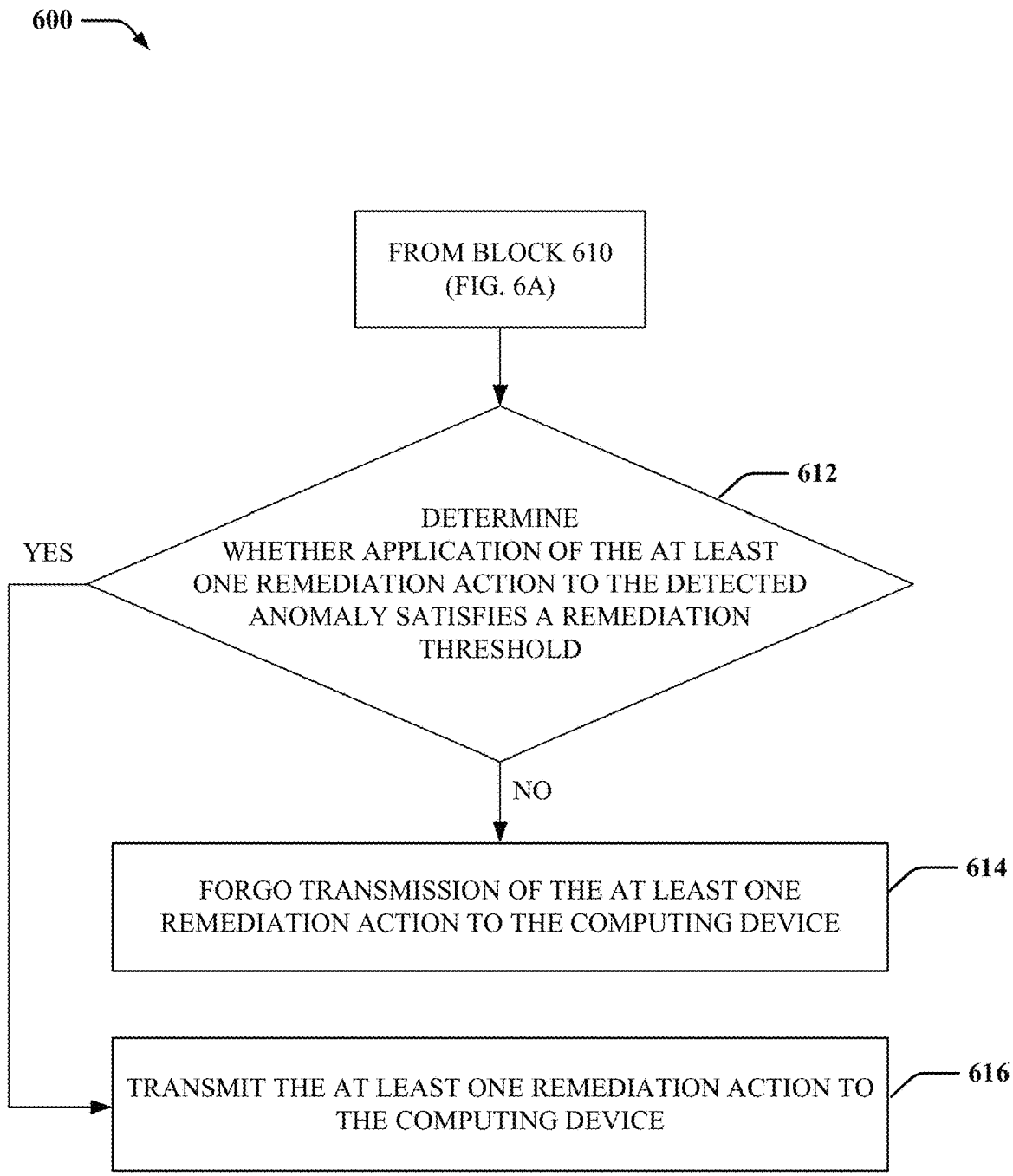

Referring now to FIGS. 6A and 6B, an example method 600 provides anomaly remediation of a computing device associated an organization 540, such as may be performed by operation of the auto-remediation component 112. The actions illustrated in the method 600 may overlap in time. For example, at an instant in time, two of the actions may be performed by different components. The execution of the actions may also be interleaved on a component. Additionally, the actions illustrated in the method 600 may be performed in an order other than illustrated in FIGS. 6A and 6B.

At block 602, the method 600 may receive telemetry data including one or more computing device error indications each associated with an anomaly occurrence at a given time. For example, as described herein, the computer device 102 may execute auto-remediation component 112 to receive telemetry data 534 including one or more computing device error indications each associated with an anomaly occurrence at a given time. In some implementations, the one or more computing device error indications may be associated with computing devices 544 external to the organization 540. That is, the organization 540 may include a set of computing devices 542 including the computing device. However, to perform anomaly remediation, the set of computing device may not be of sufficient size to form a reliable remediation action 522. As such, a larger set of telemetry data 534 may be used that includes known anomaly occurrences of not only within the organization 540, but also outside or external to the organization 540.

In some implementations, the organization 540 may include a first set of computing devices 542, and the telemetry data 534 may include data from at least one of data from the first set of computing devices 542 of the organization 540 or data from a second set of computing devices 544 external to the organization 540. The second set of computing devices 544 may be larger than the first set of computing devices 542. In some implementations, the detection parameter 514, the remediation action 522, and the remediation threshold 532 may be associated with the data from the first set of computing devices 542 and the data from the second set of computing devices 544.

In some implementations, the data external to the organization 540 may include at least one of a compatibility anomaly associated with at least one configuration of the application program, or a performance anomaly associated with at least one configuration of the application program. Further, in some implementations, the anomaly 512 may corresponds to at least one of an incompatibility of the application program within an operating system of the computing device 108, a previous version of a driver associated with the application program, an absent patch associated with the application program, or an improper configuration of the application program.

At block 604, the method 600 may determine an existence of the anomaly based on the telemetry data including the one or more computing device error indications. For example, as described herein, the computer device 102 and/or auto-remediation component 112 may execute telemetry detection component 510 to determine an existence of the anomaly 512 based on the telemetry data 534 including the one or more computing device error indications.

At block 606, the method 600 may generate the detection parameter corresponding to a confirmed instance of the anomaly. For example, as described herein, the computer device 102 and/or auto-remediation component 112 may execute telemetry detection component 510 to generate the detection parameter 514 corresponding to a confirmed instance of the anomaly 512. In some implementations, the detection parameter 514 may correspond to a confirmed instance of the anomaly 512. In some implementations, the detection parameter 514 may be generated automatically based on the existence of the anomaly 512.

At block 608, the method 600 may detect an anomaly associated with an application program at the computing device based on a detection parameter. For example, as described herein, the computer device 102, which may be a network-based server 102, may execute auto-remediation component 112 to detect, an anomaly 512 based on the detection parameter 512 associated with an application program at one or more of the computing devices 542 and/or the computing device 108.

At block 604, the method 600 may identify at least one remediation action associated with the detected anomaly. For example, as described herein, the computer device 102 may execute auto-remediation component 112 and/or remediation identification component 520 to automatically identify at least one remediation action 522 associated with the detected anomaly 512. In some implementations, the at least one remediation action 411 may be configured to adjust one or more operating characteristics 524 of one or more computing devices 542 and/or the computing device 108 to address and/or resolve the anomaly 512.

At block 606, the method 600 may determine whether application of the at least one remediation action to the detected anomaly satisfies a remediation threshold. For example, as described herein, the computer device 102 may execute auto-remediation component 112 and/or remediation determination component 530 to determine whether application of the at least one remediation action 522 to the detected anomaly 512 satisfies a remediation threshold 532. In some implementations, the remediation threshold 532 may be remediation criteria indicating a desired improvement level of the device following application of the remediation action 522. In other words, the remediation threshold 532 may correspond to an estimated improvement value of the anomaly 512 at one or more of the computing devices 542 associated with the organization and/or the computing device 108 by applying the remediation action 522.

At block 608, the method 600 may forgo transmission of the at least one remediation action to the computing device in accordance with a determination that the application of the at least one remediation action to the detected anomaly does not satisfy the remediation threshold. For example, as described herein, the computer device 102 may execute auto-remediation component 112 to forgo transmission of the at least one remediation action 522 to at least one of the computing devices 540 associated with the organization 540 and/or the computing device 108.

At block 610, the method 600 may transmit the at least one remediation action to the computing device in accordance with a determination that the application of the at least one remediation action to the detected anomaly satisfies the remediation threshold. For example, as described herein, the computer device 102 may execute auto-remediation component 112 to transmit the at least one remediation action 522 to at least one of the computing devices 540 associated with the organization 540 and/or the computing device 108. In some implementations, the method 600 may also include transmitting a service request indicating at least one of the anomaly 512 or the remediation action 522 to a different computing device from the computing devices 542 associated with the organization 540 in accordance with a determination that the application of the at least one remediation action 522 to the detected anomaly 512 satisfies the remediation threshold 532.

Although not illustrated, the method 600 may further include feedback mechanisms to measure the result of the one or more remediation actions in order to determine whether additional or different remediation action may need to be applied.

Figure 7:
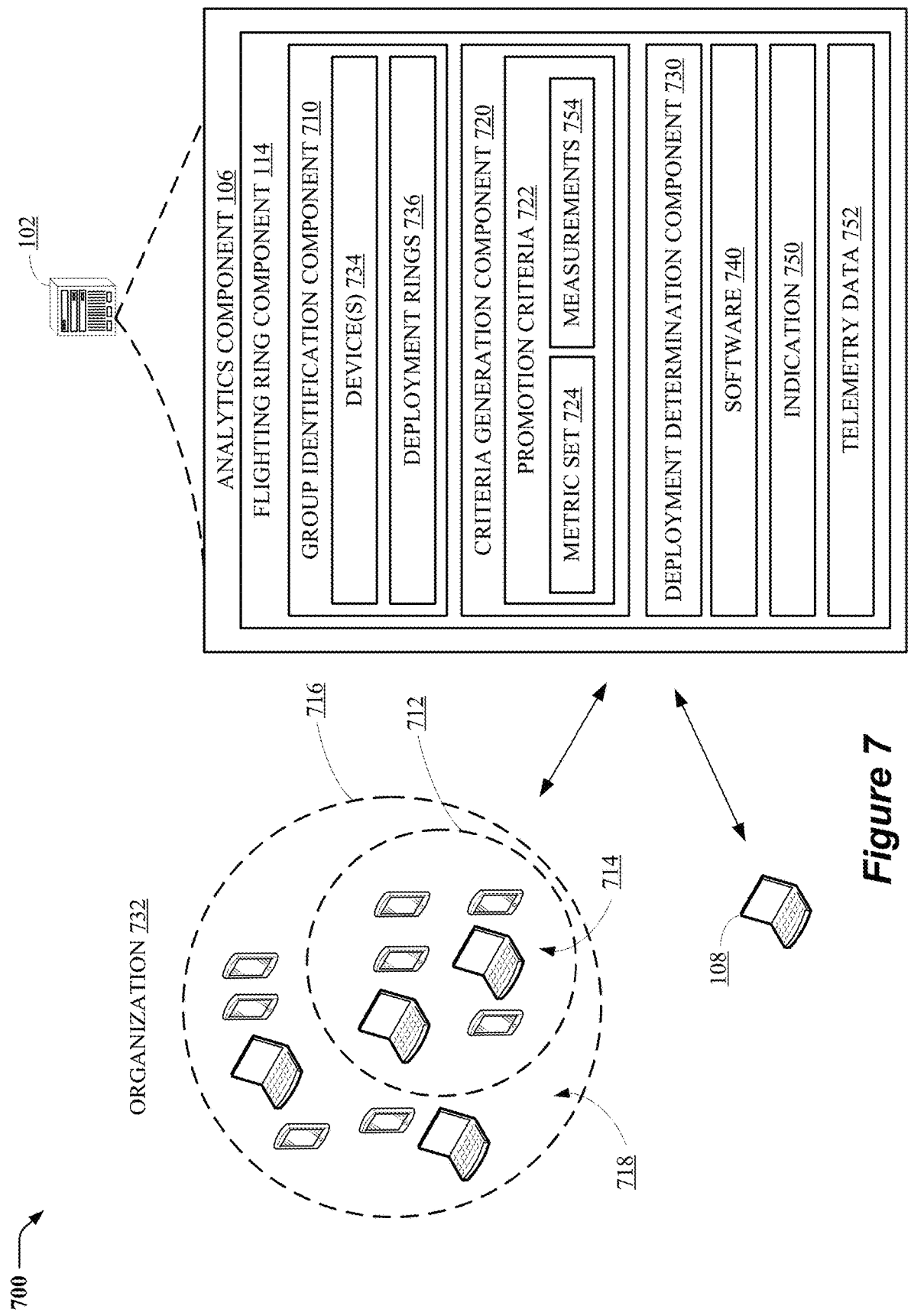
FIG. 7 is a schematic block diagram of forming one or more deployment rings for software deployment by an example flighting detection component in accordance with an implementation of the present disclosure.

Referring to FIG. 7, an example schematic diagram 700 illustrating an example of forming one or more deployment rings for software deployment by an example flighting detection component, such as the flighting detection component 114 of the analytics component 106, in accordance with various implementations of the present disclosure is described. For example, the analytics component 106 and/or flighting detection component 114 may be included in the computer device 102 (e.g., a server) as described herein. The analytics component 106 may configure the flighting detection component 114 to form one or more deployment rings for software deployment.

In some implementations, organizations may deploy software (e.g., software upgrades, updates, and/or policy configurations) to a small group of computer devices, then if there are no problems they deploy it more broadly. The goal of the organization may be to identify a representative sample of their devices which they can test a given change (operating system, application, driver updates, new configurations or policies, etc.) against before risking deployment to their entire device population. Constructing the optimal set of deployment rings 736 and associated promotion criteria 722 can prove difficult without telemetry data 752. As such, telemetry data 752 may be used to automatically create or assist in the creation of deployment rings 736 along with promotion criteria 722 (e.g., quality validation criteria) that may be be met before software 740 should be allowed to flow to a subsequent deployment ring.

For example, flighting ring component 114 may be configured to gather telemetry data 752 from all devices in an organization 732 to identify various dimensions/features which are grouped to produce strata or device groups. Each strata may be mapped to corresponding strata generated from an entire set of all commercial devices sending telemetry to the analytics component 106. The commercial strata which have already deployed the given change may be identified and promotion criteria 722 are analyzed. Strata with the best results may be weighted with higher priority while strata with the worse results (e.g., poor results or lower CI/higher MoE) are prioritized lower. These weightings may be used to construct an initial deployment plan within the organization 732. The number of deployment rings 736 may be calculated based on a function of the number of strata and/or the number of devices in each strata. For instance, the deployment rings 736 may include a first deployment ring 712 including one or more devices 714 and a second deployment ring 716 including one or more devices 718.

In some implementations, rather than just include all devices from a given strata in a deployment ring, a sample is taken from each strata and allocated to an appropriate deployment ring. Strata with high prioritization may appear more prevalently in the initial rings while strata with lower prioritization may not appear in the initial deployment rings. With each time interval, both the organizations and all commercial strata and metrics may be recalculated and non-completed deployment rings are updated. This process may be repeated until all deployment rings are completed.

Further, promotion from one deployment ring (e.g., first deployment ring 712) to the next deployment ring (e.g., second deployment ring 716) may be accomplished by satisfying the complete set of promotion criteria 722 specified for the ring (e.g., first deployment ring 712). Promotion criteria 722 may take the form of a set of measures (e.g., install success rate greater than or equal to a value such as 90%) and various associated metrics (a trailing mean of a number of defend duration, standard deviation, CI, MoE, etc.). A base set of measures and metrics may be shared across all deployment rings 736, while dynamic measures and/or metrics can be selected based on ring specific characteristics. Further, measures and metrics may be evaluated for each strata in each ring and compared against corresponding strata from all commercial devices. Once promotion criteria are satisfied for a given ring, deployment of the change may be triggered to all devices in the same and/or next ring. Any issues or anomalies which are detected based on promotion criteria may be raised as alerts and notifications.

The set of deployment rings 736 can be larger for larger organizations. In some instances, telemetry data 752 may be used to automatically create or assist in the creation of deployment rings 736 by finding devices with the right diversity level in different flighting rings. The organization 732 may create promotion criteria 722 (e.g., quality validation criteria) that may be met before software 740 is allowed to flow to the next ring, and to verify if the promotion criteria 722 has been met. The organization 732 may provide some constraints (e.g., only pick from computer devices in these pools; restring to certain geographic regions, groups of devices or users, or other criteria), and auto-select the minimum set of computer devices that may enable evaluation of the promotion criteria 722.

The promotion criteria 722 may include a set of metrics, such as, install success rate, post-install reliability, performance, and user sentiment criteria; and a set of configurations, such as, across a specific set of diversity filters similar to the ones described in the industry average clustering algorithm (device model, OS version, apps, drivers, configuration, etc.). The organization 732 may gain coverage of business critical applications running in various configurations. The system may continuously eventuates new software deployments to see if they meet the promotion criteria within a given ring. If so, they may be auto-promoted to the next ring. If there are problems, the organization 732 is notified so they can take corrective action.

In an implementation, the flighting detection component 114 may include a group identification component 710, which may be configured to identify one or more devices 714 within distinct device groups to form a first deployment ring 712.

In an implementation, the fighting detection component 114 may include a criteria generation component 720, which may be configured to generate promotion criteria 722 including at least one of a metric set 724 representing performance data of the one or more devices 714 or a configuration set representing one or more operating characteristics of the one or more devices 714.

In an implementation, the fighting detection component 114 may include a deployment determination component 730, which may be configured to determine, during deployment of software 740, whether the one or more devices 714 within the at least one deployment ring 712 satisfy the promotion criteria 722. For example, the analytics component 106 may provide an indication 750 representing an anomaly to a remote computing device 108 based on a determination that the one or more devices 714 within the at least one deployment ring 712 do not satisfy the promotion criteria 722. In another example, the analytics component 106 may deploy the software 740 to a second deployment ring 716 based on a determination that the one or more devices 714 within the at least one deployment ring 712 satisfy the promotion criteria 722.

Figure 8A:
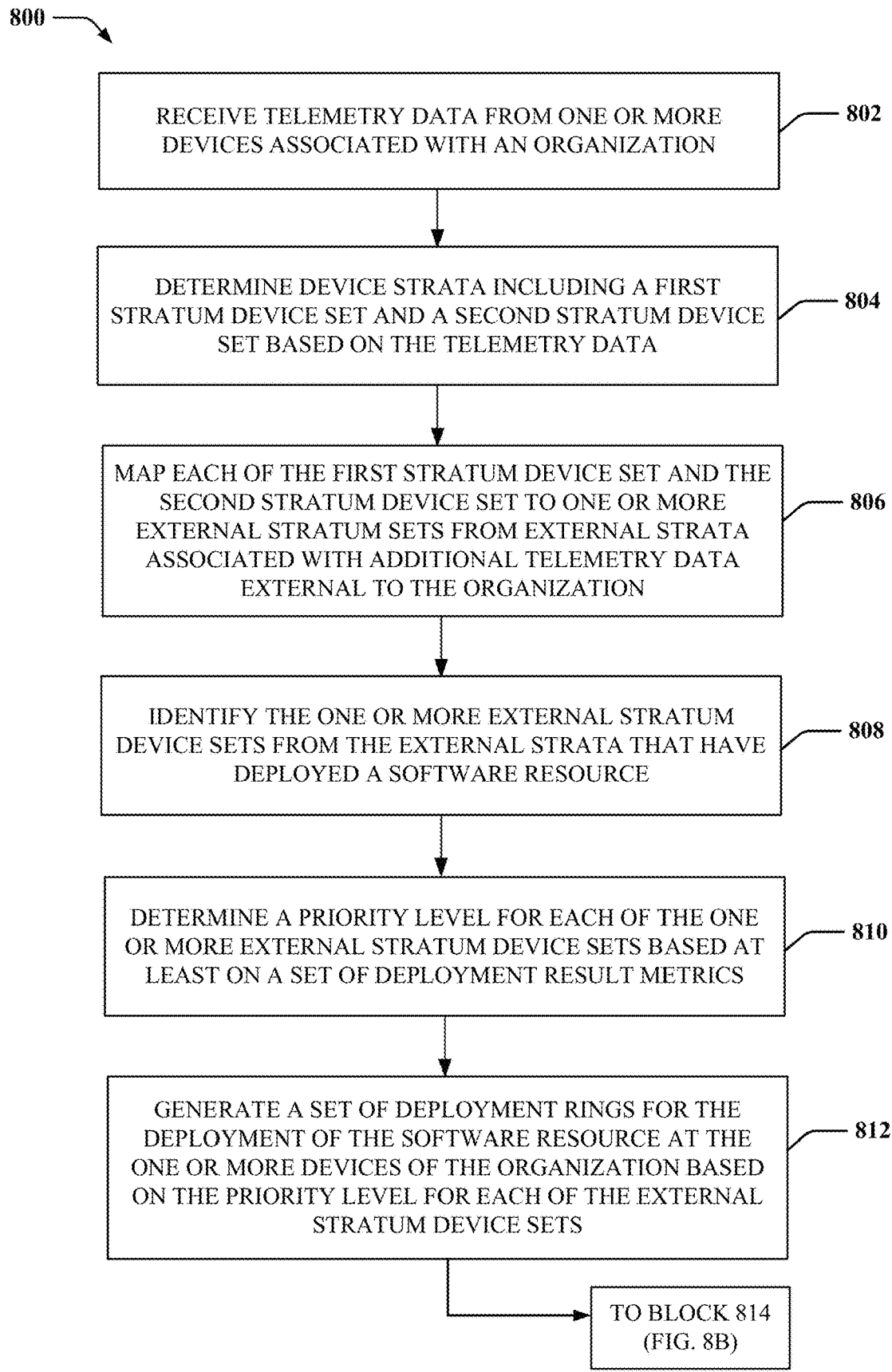
FIGS. 8A and 8B are flow charts of a method of forming one or more deployment rings for software deployment in accordance with an implementation of the present disclosure.
Figure 8B:
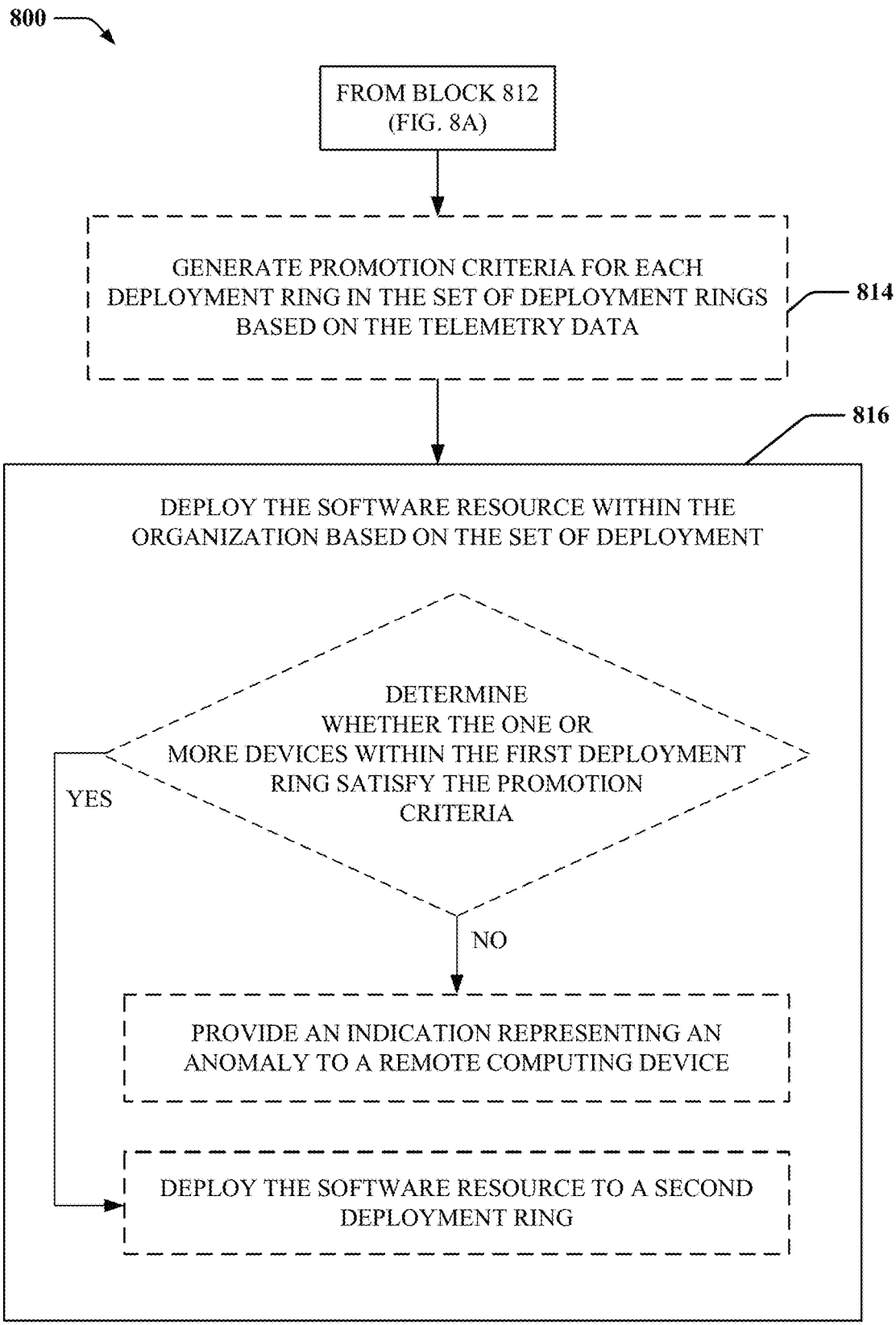

Referring now to FIGS. 8A and 8B, an example method 800 forms one or more deployment rings for software deployment, such as via operation of flighting ring component 114. The actions illustrated in the method 800 may overlap in time. For example, at an instant in time, two of the actions may be performed by different components. The execution of the actions may also be interleaved on a component. Additionally, the actions illustrated in the method 800 may be performed in an order other than illustrated in FIGS. 8A and 8B.

At block 802, the method 800 may receive telemetry data from the one or more devices associated with the organization. For example, as described herein, the computer device 102 may execute flighting ring component 114 to receive telemetry data 752 from the one or more devices associated with the organization 732. In some implementations, the one or more devices may include some or all of the devices within the organization 732.

At block 804, the method 800 may determine device strata including a first stratum device set and a second stratum device set based on the telemetry data, each device stratum set defining one or more device groups within the organization. For example, as described herein, the computer device 102 may execute flighting ring component 114 and/or group identification component 710 to determine device strata including a first stratum device set and a second stratum device set based on the telemetry data 752. In some implementations, each device stratum set may define one or more device groups within the organization 732.

At block 806, the method 800 may map each of the first stratum device set and the second stratum device set to one or more external stratum sets from external strata associated with additional telemetry data external to the organization. For example, as described herein, the computer device 102 may execute flighting ring component 114 to map each of the first stratum device set and the second stratum device set to one or more external stratum sets from external strata associated with additional telemetry data external to the organization 732.

At block 808, the method 800 may identify the one or more external stratum device sets from the external strata that have deployed a software resource, wherein the deployment of the software resource is associated with promotion criteria. For example, as described herein, the computer device 102 may execute flighting ring component 114 and/or group identification component 710 to identify the one or more external stratum device sets from the external strata that have deployed a software resource 740. In some implementations, the deployment of the software resource 740 may be associated with the promotion criteria 722.

At block 810, the method 800 may determine a priority level for each of the one or more external stratum device sets based at least on a set of deployment result metrics. For example, as described herein, the computer device 102 may execute flighting ring component 114 to determine a priority level for each of the one or more external stratum device sets based at least on a set of deployment result metrics.

At block 812, the method 800 may generate a set of deployment rings for the deployment of the software resource at the one or more devices of the organization based on the priority level for each of the external stratum device sets. For example, as described herein, the computer device 102 may execute flighting ring component 114 and/or group identification component 710 to generate a set of deployment rings 736 for the deployment of the software resource 740 at the one or more devices 734 of the organization 732 based on the priority level for each of the external stratum device sets.

In some implementations, the set of deployment rings 736 may include a first deployment ring 712 including one or more device 714 and a second deployment ring 716 including one or more device 718 different from the one or more devices 714 of the first deployment ring 712. In some implementations, the first deployment ring 712 may include a subset of devices from the first stratum device set, and the second deployment ring 716 may include a subset of devices from the second stratum device set. In some implementations, generating a set of deployment rings 736 may include determining a number of deployment rings based on at least one of a function of a number of stratum device sets within the device strata or a number of devices within each stratum device set.

At block 814, method 800 may generate promotion criteria for each deployment ring in the set of deployment rings based on the telemetry data. For example, as described herein, the computer device 102 may execute flighting ring component 114 and/or criteria generation component 720 to generate promotion criteria 722 for each deployment ring (e.g., first deployment ring 712 and second deployment ring 716) in the set of deployment rings 736 based on the telemetry data 752.

In some implementations, the promotion criteria 722 may include at least one of a set of measurements 754 representing one or more operating characteristics of the one or more devices 734 or a metric set 734 associated with the set of measurements 754 and representing performance data of the one or more devices 754. Further, in some implementations, the promotion criteria 722 for each deployment ring from the set of deployment rings 736 may include a shared set of measurements 754 and metric set 724 in addition to a ring-specific set of measurements and metric set.

In some implementations, the set of measurements 754 may include at least one of an install success rate value, a post-install reliability value, a performance measurement value, or a user sentiment indication. Additionally, in some implementations, the metric set 724 may include at least one of a trailing mean duration value or a standard deviation value, for at least one from the set of measurements 754. In some implementations, the promotion criteria 722 and the set of deployment rings 736 may be generated automatically based on the telemetry data 752.

At block 816, the method 800 may deploy the software resource within the organization based on the set of deployment rings. For example, as described herein, the computer device 102 may execute flighting ring component 114 and/or deployment determination component 730 to deploy the software resource 740 within the organization 732 based on the set of deployment rings 736.

As part of block 816, the method 800 may determine whether the one or more devices within the at least one deployment ring satisfy the promotion criteria. For example, as described herein, the computer device 102 may execute flighting ring component 114 and/or deployment determination component 730 to determine, during deployment of the software 740, whether the one or more devices (e.g., one or more devices 714) within the at least one deployment ring (e.g., first deployment ring 712) satisfy the promotion criteria 722.

As part of block 816, the method 800 may provide an indication representing an anomaly to a remote computing device in accordance with a determination that the one or more devices within the first deployment ring do not satisfy the promotion criteria. For example, as described herein, the computer device 102 may execute flighting ring component 114 to provide an indication 750 representing an anomaly to a remote computing device 108.

As part of block 816, the method 800 may deploy the software to a second deployment ring in accordance with a determination that the one or more devices within the first deployment ring satisfy the promotion criteria. For example, as described herein, the computer device 102 may execute flighting ring component 114 and/or deployment determination component 730 to deploy the software resource 740 to one or more devices 718 of a second deployment ring 716.

Figure 9A:
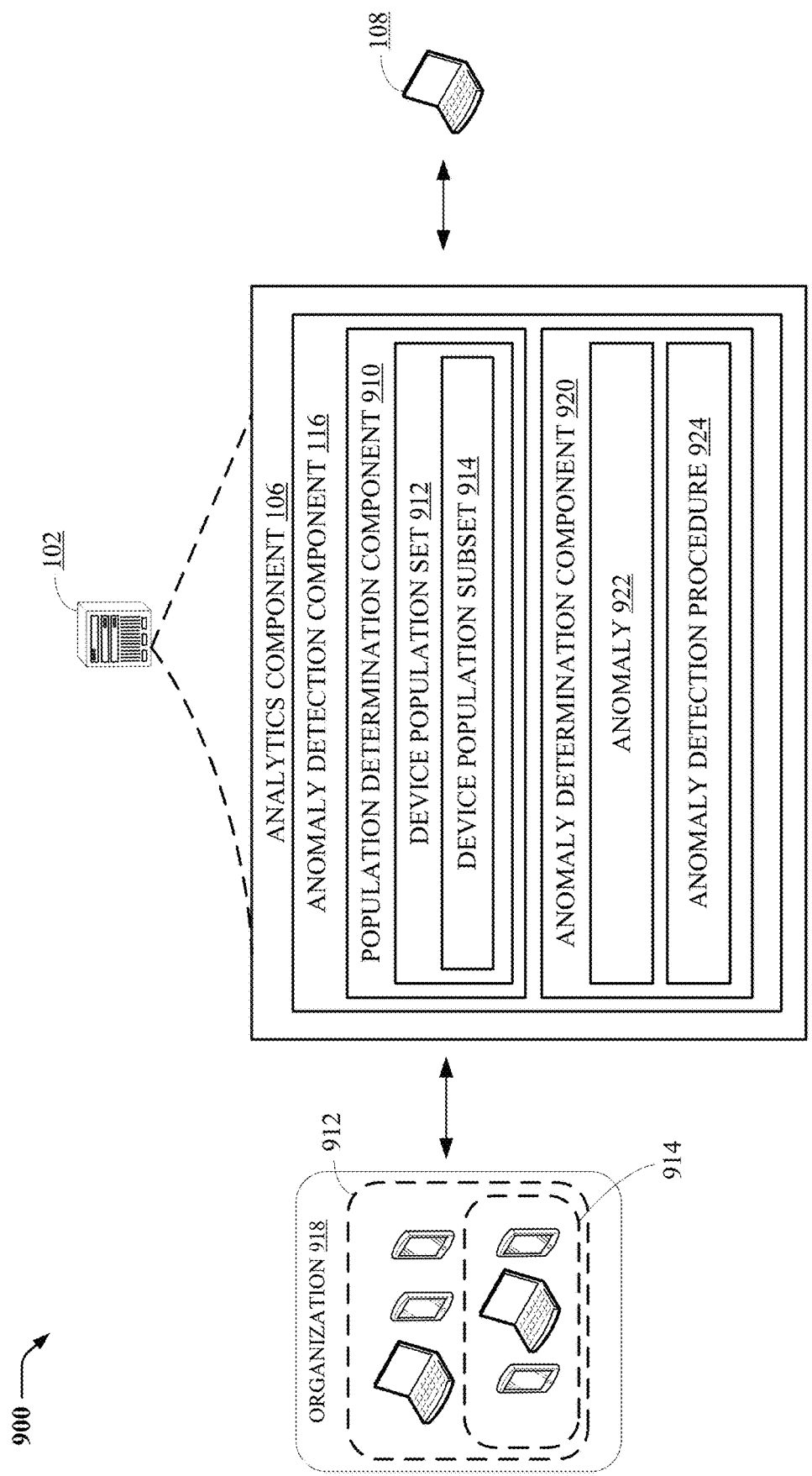
FIG. 9A is a schematic block diagram of automatic anomaly detection for device population subsets by an example anomaly detection component in accordance with an implementation of the present disclosure.
Figure 9B:
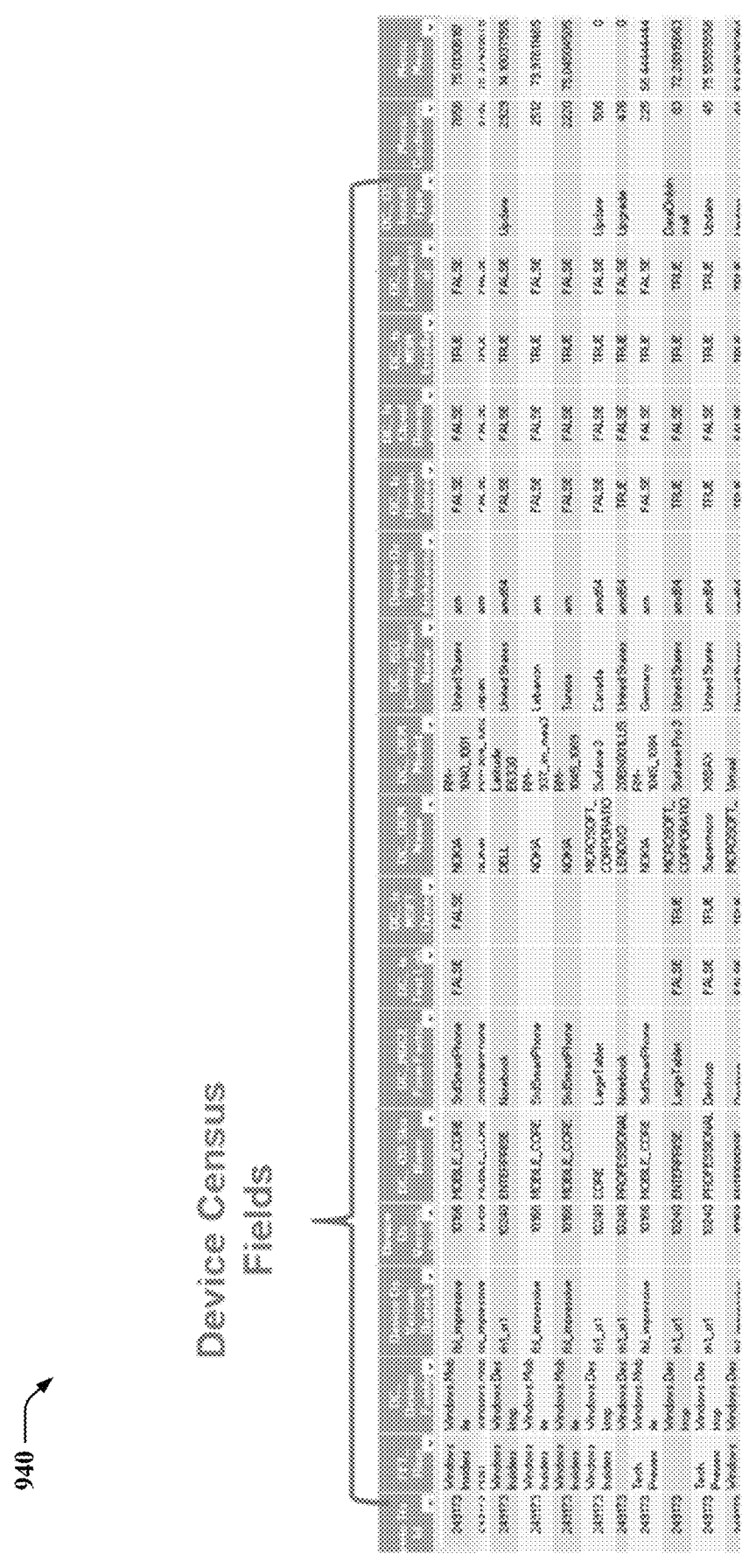

Referring to FIG. 9A, an example schematic diagram 900 illustrating an example of automatic anomaly detection for device population sets and/or subsets by the anomaly detection component 116 of the analytics component 106, in accordance with various implementations. For example, the analytics component 106 and/or anomaly detection component 116 may be included in the computer device 102 (e.g., a server) as described herein. The analytics component 106 may configure the anomaly detection component 116 to automatically detect anomalies for device population subsets. In an implementation, the anomaly detection component 116 may include an anomaly detection component 910, which may be configured to determine a device population subset 914 from a device population set 912 based on one or more device census fields. The device population set 912 may be a set of all devices at or associated with an organization 918. The device population subset 914 may be a specific group of devices forming a subset of the device population set 912 and selected based on one or more constricting factors such as a group formed from one or more device census fields.

In an implementation, the anomaly detection component 116 may include an anomaly determination component 920, which may be configured to determine one or more anomalies 922 within the device population subset 914 based on performing at least one anomaly detection procedure 924 using the device population subset 914. For example, the analytics component 106 may be configured to provide the one or more anomalies 922 to a computing device 108. Upon detection of the anomaly 922, the anomaly detection component 116 may be configured to resolve the anomaly according to one or more implementations described herein, for example, with respect to auto-remediation (e.g., FIGS. 5, 6A, and 6B).

In some implementations, the anomaly detection component 116 may be configured to locate point anomalies in some or all slice time series. The anomaly detection component 116 may further be configured to verify point anomalies by comparing the slice time series against a corresponding main slice time series. The anomaly detection component 116 may further be configured to cluster detected anomalies, for example according to a clustering mechanism as described herein with respect to FIG. 9E. The anomaly detection component 116 may further be configured to apply supervised learning to identify clusters factors.

FIG. 9B is a chart diagram 940 of population slices and one or more associated attributes in accordance with an implementation of the present disclosure. The chart diagram 940 may include one or more device census fields for organizing and classifying devices at the organization 918 according to one or more parameters. The chart diagram 940 may provide a detailed view of telemetry data from the organization 918, which may include the device population set 912. For example, when considering operation of the device population set 912, a high level view may not reveal anomalies that may otherwise exist for a subset or group of devices in the organization 918. Accordingly, to identify the anomaly 922 in the device population subset 914, a number or portion of the device census fields may be considered. Further, a search may be limited to certain branches of the device census fields to also identify the anomaly 922. Additionally, EDS central measures may be considered to identify the anomaly 922.

Figure 9C:
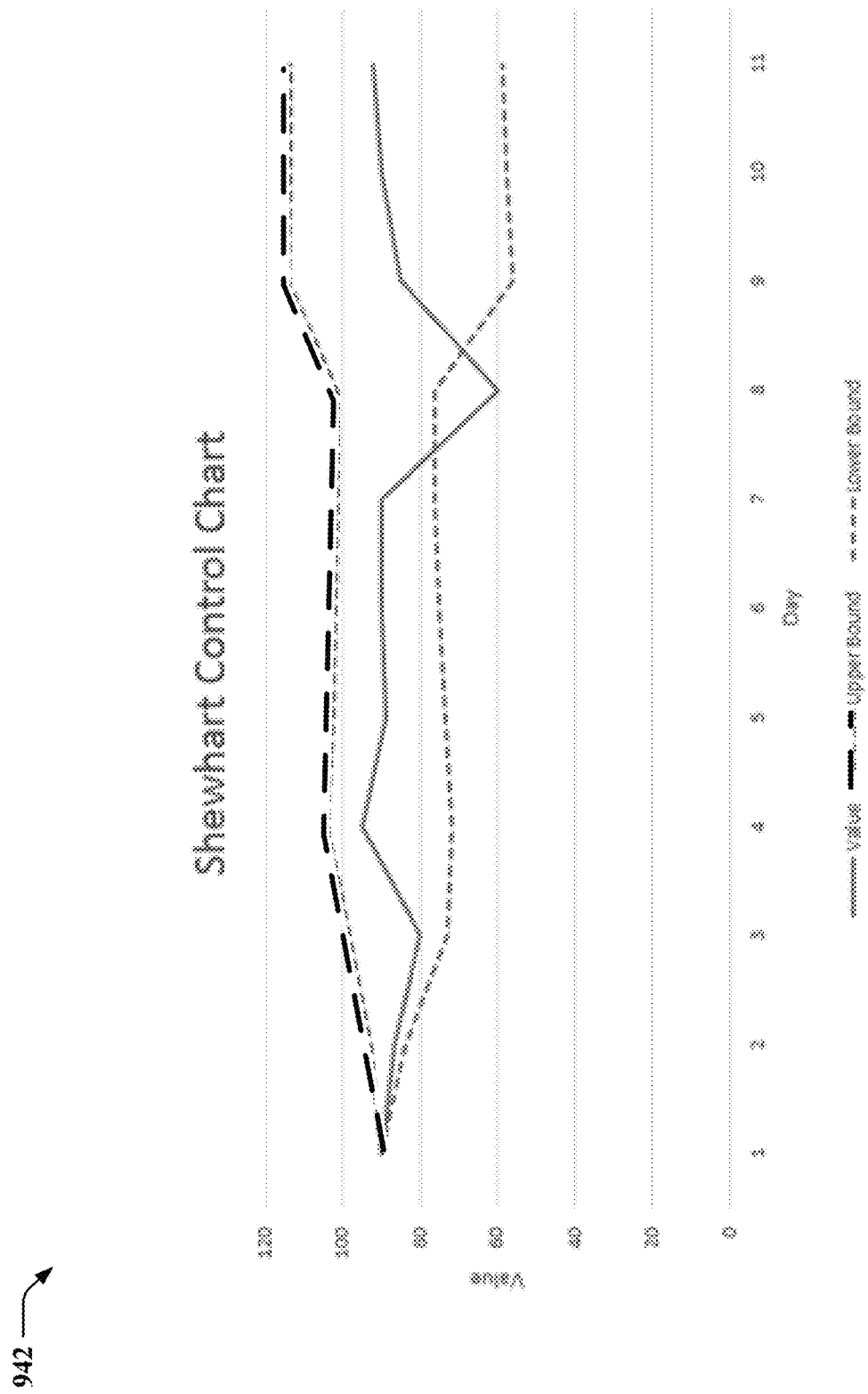
FIG. 9C is a chart diagram illustrating anomaly detection in accordance with an implementation of the present disclosure.

FIG. 9C is a chart diagram 942 illustrating anomaly detection in accordance with an implementation of the present disclosure. The top bar represents the upper anomaly boundary while the lower bar represents the lower anomaly boundary. The line representing the value indicates the data from the chart diagram 942. As illustrated the line representing the value may dip below the lower anomaly boundary at approximately day eight. For example, the at least one anomaly detection procedure 924 may include configuring an upper anomaly boundary corresponding to one or more maximum values over a period of time and a lower anomaly boundary corresponding to one or more minimum values over the period of time, determining whether at least one anomaly exceeds either the upper anomaly boundary or the lower anomaly boundary.

Figure 9D:
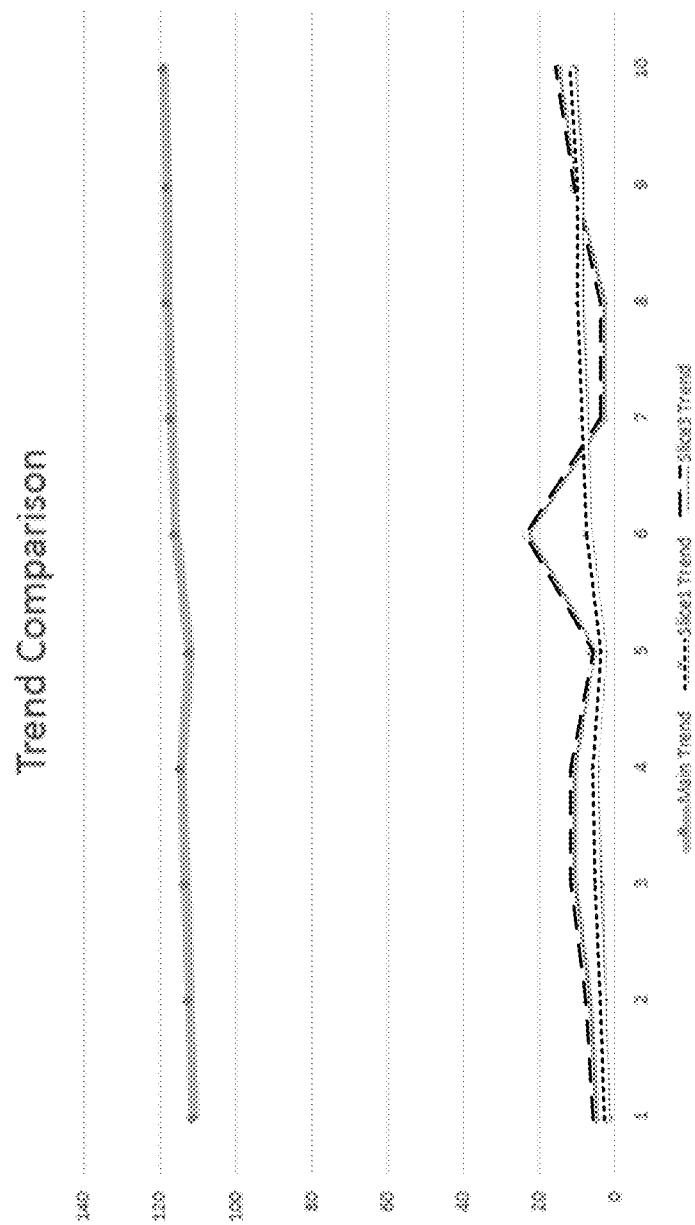
FIG. 9D is a chart diagram illustrating a trend comparison in accordance with an implementation of the present disclosure.

FIG. 9D is a chart diagram 944 illustrating a trend comparison in accordance with an implementation of the present disclosure. The trend comparison may include a main trend and at least one slice trend. For example, the main trend may be a trend based on historical data for the device population set 912 and/or the device population subset 914. A slice trend may be a current or actual representation of the device population subset 914. In the illustrated example, two slice trends are depicted each representing a distinct slice from the device population set 912. Although slice 1 trend may correlate with the main trend, slice 2 trend does not correlate with the main trend, thereby indicating the existence of an anomaly in the device population subset 914 associated with the slice 2 trend. For example, the correlation between the main trend and the slice 1 trend may be 0.99. Further, the correlation between the main trend and the slice 2 trend may be 0.23. In some implementations, the trends comparison may be performed using a cosine correlation formula such as:

$$r = \frac{\sum (x - \bar{x})(y - \bar{y})}{\sqrt{\sum (x - \bar{x})^2} \sqrt{\sum (y - \bar{y})^2}}$$

Figure 9E:
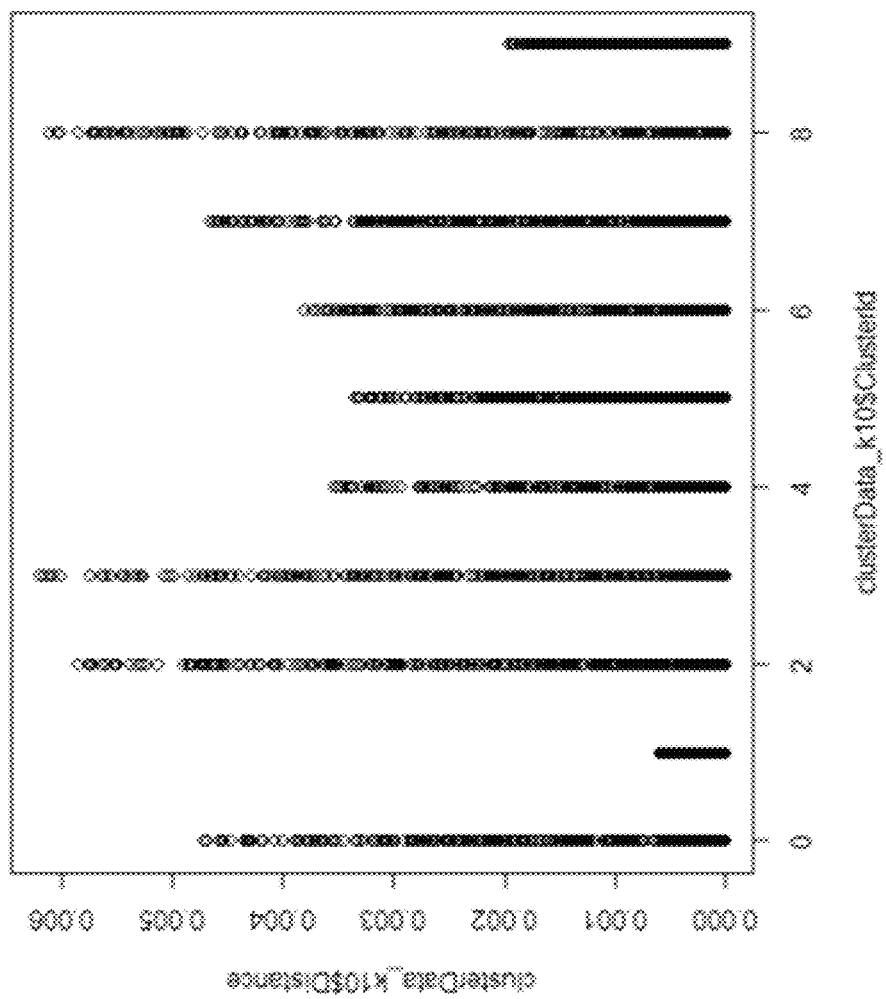
FIG. 9E is a chart diagram illustrating anomaly clustering in accordance with an implementation of the present disclosure.
Figure 10:
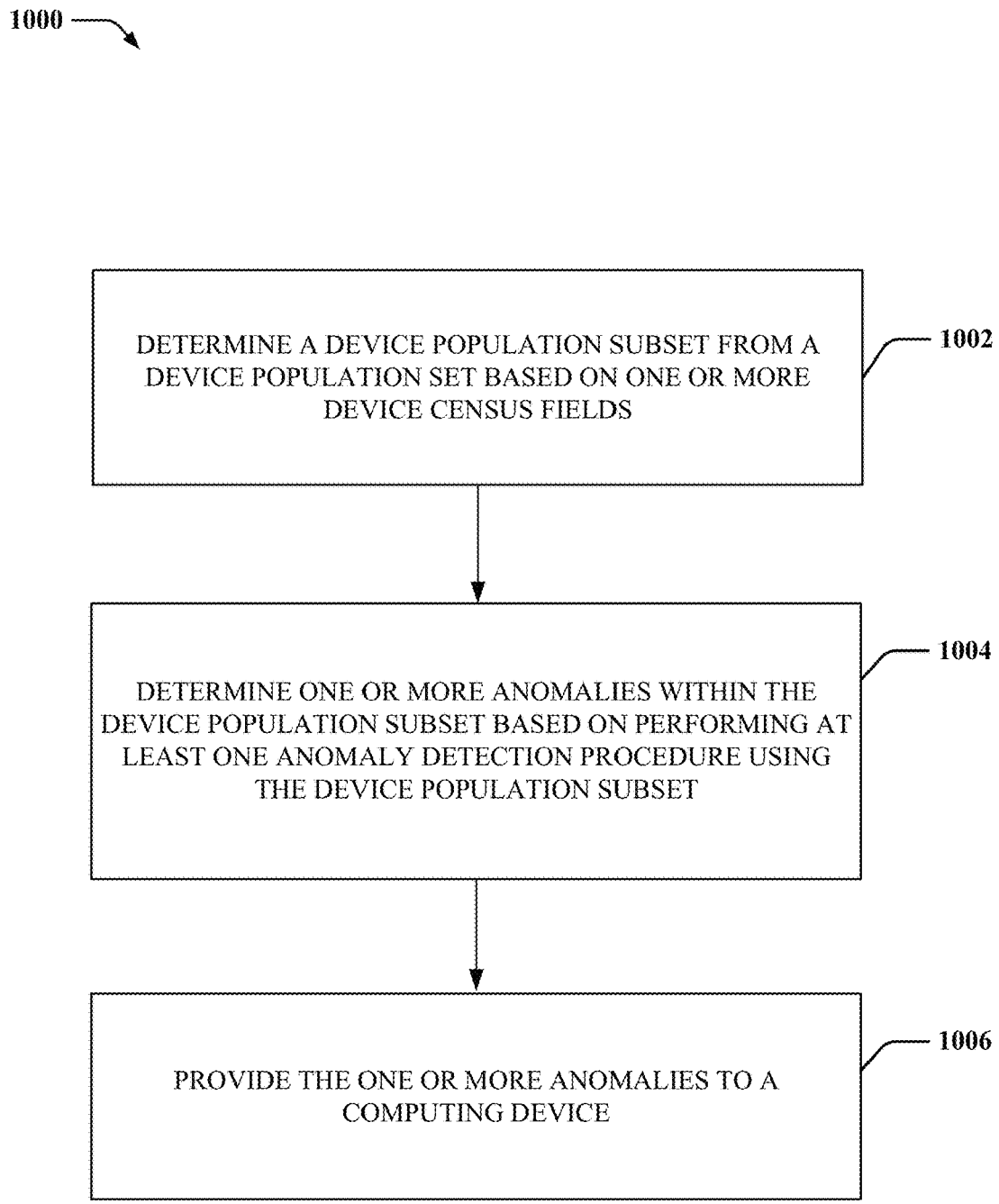
FIG. 10 is a flow chart of a method of automatic anomaly detection for device population subsets in accordance with an implementation of the present disclosure.

FIG. 9E is a chart diagram illustrating anomaly clustering in accordance with an implementation of the present disclosure. The anomalies may be clustered using or according to 'K' means. For example, the 'K' value may be set to ten, which provides clustering in ten groups. Specifically, the anomalies may be clustered with respect to a distance and a cluster identifier. Referring now to FIG. 10, an example method 1000 provides an automatic anomaly detection for device population subsets, such as via operation of anomaly detection component 116. The actions illustrated in method 1000 may overlap in time. For example, at an instant in time, two of the actions may be performed by different components. The execution of the actions may also be interleaved on a component. Additionally, the actions illustrated in method 1000 may be performed in an order other than illustrated in FIG. 10.

At block 1002, method 1000 may determine a device population subset from a device population set based on one or more device census fields. For example, as described herein, the computer device 102 may execute anomaly detection component 116 to determine a device population subset/slice from a device population set based on one or more device census fields.

At block 1004, method 1000 may determine one or more anomalies within the device population subset based on performing at least one anomaly detection procedure using the device population subset. For example, as described herein, the computer device 102 may execute anomaly detection component 116 to determine one or more anomalies within the device population subset/slice based on performing at least one anomaly detection procedure using the device population subset. In some implementations, the at least one anomaly detection procedure may include a correlation of the metric values of the device over time and/or a correlation of the metric values to the device population set.

At block 1006, method 1000 may provide the one or more anomalies to a computing device. For example, as described herein, the computer device 102 may execute anomaly detection component 116 to provide the one or more anomalies to a computing device 108. Alternatively, the one or more anomalies may be provided to auto-remediation component 112 and/or flighting ring component 114 for their use, as described above.

Figure 11:
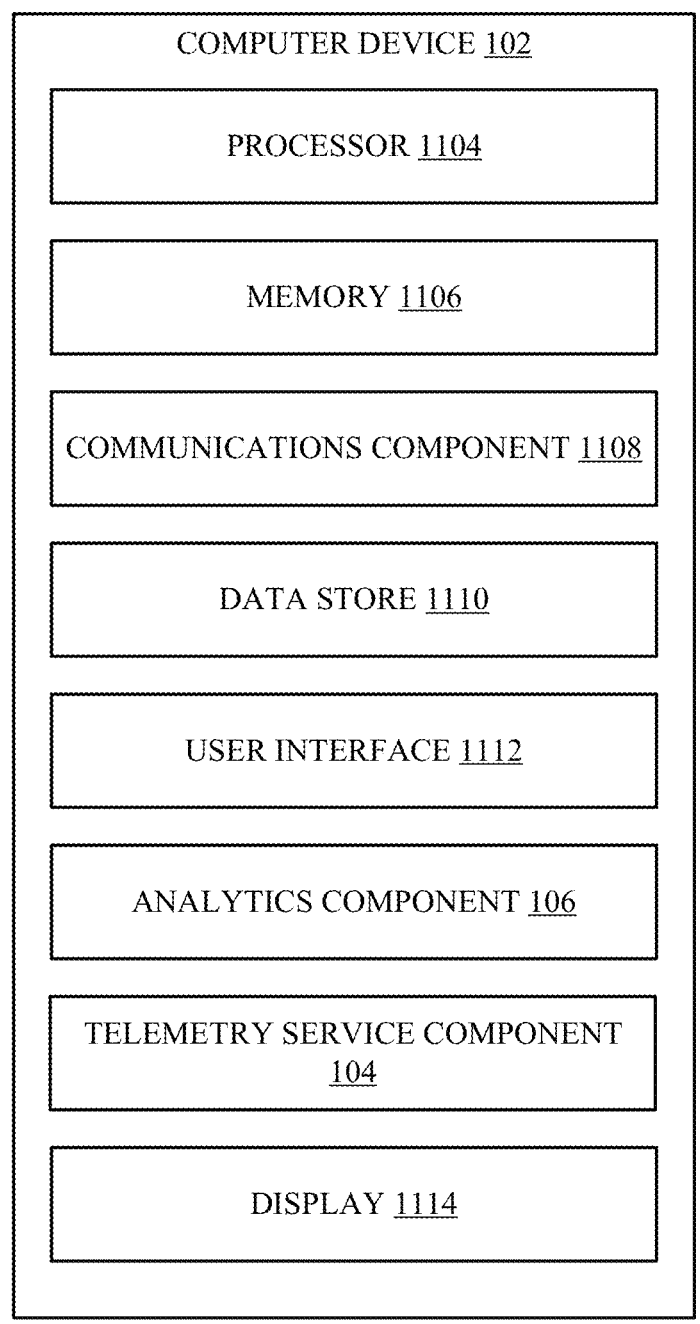
FIG. 11 is a schematic block diagram of an example computer device in accordance with an implementation of the present disclosure.

Referring now to FIG. 11, illustrated is an example computer device 102 in accordance with an implementation, including additional component details (relative to telemetry service component 104, data pump 118, and analytics component 106) as compared to FIG. 1. In one example, computer device 102 may include processor 1104 for carrying out processing functions associated with one or more of components and functions described herein. Processor 1104 can include a single or multiple set of processors or multi-core processors. Moreover, processor 1104 can be implemented as an integrated processing system and/or a distributed processing system. In an implementation, for example, processor 1104 may include a CPU. In an example, computer device 102 may include memory 1106 for storing instructions executable by the processor 1104 for carrying out the functions described herein.

Further, computer device 102 may include a communications component 1108 that provides for establishing and maintaining communications with one or more parties utilizing hardware, software, and services as described herein. Communications component 1108 may carry communications between components on computer device 102, as well as between computer device 102 and external devices, such as devices located across a communications network and/or devices serially or locally connected to computer device 102. For example, communications component 1108 may include one or more buses, and may further include transmit chain components and receive chain components associated with a transmitter and receiver, respectively, operable for interfacing with external devices.

Additionally, computer device 102 may include a data store 1110, which can be any suitable combination of hardware and/or software, that provides for mass storage of information, databases, and programs employed in connection with implementations described herein. For example, data store 1110 may be a data repository for operating system and/or applications.

Computer device 102 may also include a user interface component 1112 operable to receive inputs from a user of computer device 102 and further operable to generate outputs for presentation to the user. User interface component 1112 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 1112 may include one or more output devices, including but not limited to a display, a speaker, a haptic feedback mechanism, a printer, any other mechanism capable of presenting an output to a user, or any combination thereof.

In an implementation, user interface component 1112 may transmit and/or receive messages corresponding to the operation of operating system and/or application. In addition, processor 1104 executes operating system and/or application, and memory 1106 or data store 1110 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A method of resource deployment at an organization including one or more devices, comprising:
    receiving telemetry data from one or more devices of a first device set;
    determining device strata including a first device stratum and a second device stratum based on the telemetry data, each device stratum defining one or more device groups within the first device set;
    mapping each of the first device stratum and the second device stratum to external strata associated with additional telemetry data external to the first device set;
    identifying a software resource deployed in the external strata, wherein the deployment of the software resource is associated with promotion criteria;
    determining, based at least on a set of deployment result metrics, a priority level for each of the external strata;
    generating, based on the priority level for each of the external strata, at least one deployment ring for the deployment of the software resource at the one or more devices of the first device set; and
    deploying, based on the at least one deployment ring, the software resource within the first device set based on the at least one deployment ring.

2. The method of claim 1, further comprising generating promotion criteria for each deployment ring in the at least one deployment ring based on the telemetry data, wherein the promotion criteria, when satisfied, permits deployment of the software resource from one deployment ring to another deployment ring of the at least one deployment ring.

3. The method of claim 2, wherein the promotion criteria includes at least one of a set of measurements representing one or more operating characteristics of the one or more devices or a metric set associated with the set of measurements and representing performance data of the one or more devices.

4. The method of claim 3, wherein the promotion criteria for each deployment ring includes a shared set of measurements and the metric set in addition to a ring-specific set of measurements and the metric set.

5. The method of claim 3, wherein the set of measurements includes at least one of:
    an install success rate value,
    a post-install reliability value,
    a performance measurement value, or
    a user sentiment indication.

6. The method of claim 3, wherein the metric set includes at least one of a trailing mean duration value or a standard deviation value.

7. The method of claim 2, wherein the at least one deployment ring includes a first deployment ring and a second deployment ring, and wherein deploying the software resource within the first device set includes:
    determining whether one or more devices within the first deployment ring satisfy the promotion criteria;
    in accordance with a determination that the one or more devices within the first deployment ring do not satisfy the promotion criteria, providing an indication representing an anomaly to a remote computing device; and in accordance with a determination that the one or more devices within the first deployment ring satisfy the promotion criteria, deploying the software resource to the second deployment ring.

8. The method of claim 7, wherein the first deployment ring includes a subset of devices from the first device stratum, and the second deployment ring includes a subset of devices from the second device stratum.

9. The method of claim 2, wherein the promotion criteria and the at least one of deployment ring are generated automatically based on the telemetry data.

10. The method of claim 1, wherein generating the at least one deployment ring includes determining, based on at least one of a function of a number of device strata or a number of devices within each device stratum, a number of deployment rings.

11. An apparatus for resource deployment at an organization including one or more devices, comprising:
a memory; and
at least one processor in communication with the memory, wherein the at least one processor is configured to:
receive telemetry data from the one or more devices associated with the organization;
determine device strata including a first stratum device set and a second stratum device set based on the telemetry data, each device stratum set defining one or more device groups within the organization;
map each of the first stratum device set and the second stratum device set to one or more external stratum device sets from external strata associated with additional telemetry data external to the organization;
identify the one or more external stratum device sets from the external strata that have deployed a software resource, wherein the deployment of the software resource is associated with promotion criteria;
determine a priority level for each of the one or more external stratum device sets based at least on a set of deployment result metrics;
generate a set of deployment rings for the deployment of the software resource at the one or more devices of the organization based on the priority level for each of the external stratum device sets; and
deploy the software resource within the organization based on the set of deployment rings.

12. The apparatus of claim 11, further comprising generating promotion criteria for each deployment ring in the set of deployment rings based on the telemetry data, wherein the promotion criteria, when satisfied, permits deployment of the software resource from one deployment ring to another deployment rings of the set of deployment rings.

13. The apparatus of claim 12, wherein the promotion criteria includes at least one of a set of measurements representing one or more operating characteristics of the one or more devices or a metric set associated with the set of measurements and representing performance data of the one or more devices.

14. The apparatus of claim 13, wherein the promotion criteria for each deployment rings includes a shared set of measurements and the metric set in addition to a ring-specific set of measurements and the metric set.

15. The apparatus of claim 13, wherein the set of measurements includes at least one of:
an install success rate value,
a post-install reliability value,
a performance measurement value, or
a user sentiment indication.

16. The apparatus of claim 13, wherein the metric set includes at least one of a trailing mean duration value or a standard deviation value.

17. The apparatus of claim 12, wherein the set of deployment rings include a first deployment ring and a second deployment ring, and wherein deploying the software resource within the organization includes:
determining whether one or more devices within the first deployment ring satisfy the promotion criteria;
in accordance with a determination that the one or more devices within the first deployment ring do not satisfy the promotion criteria, providing an indication representing an anomaly to a remote computing device; and
in accordance with a determination that the one or more devices within the first deployment ring satisfy the promotion criteria, deploying the software resource to the second deployment ring.

18. The apparatus of claim 17, wherein the first deployment ring includes a subset of devices from the first stratum device set, and the second deployment ring includes a subset of devices from the second stratum device set.

19. The apparatus of claim 11, wherein generating a set of deployment rings includes determining a number of deployment rings based on at least one of a function of a number of stratum device sets within the device strata or a number of devices within each stratum device set.

20. A non-transitory computer-readable medium storing instructions executable by a server device for resource deployment at an organization including one or more devices, comprising at least one instruction for causing the server device to:
receive telemetry data from the one or more devices associated with the organization;
determine device strata including a first stratum device set and a second stratum device set based on the telemetry data, each device stratum set defining one or more device groups within the organization;
map each of the first stratum device set and the second stratum device set to one or more external stratum device sets from external strata associated with additional telemetry data external to the organization;
identify the one or more external stratum device sets from the external strata that have deployed a software resource, wherein the deployment of the software resource is associated with promotion criteria;
determine a priority level for each of the one or more external stratum device sets based at least on a set of deployment result metrics;
generate a set of deployment rings for the deployment of the software resource at the one or more devices of the organization based on the priority level for each of the external stratum device sets; and
deploy the software resource within the organization based on the set of deployment rings.

* * * * *